United States Patent
Ueno et al.

(10) Patent No.: US 11,109,459 B2
(45) Date of Patent: Aug. 31, 2021

(54) DRIVE CIRCUIT AND LIGHT EMITTING DEVICE

(71) Applicants: Tsuyoshi Ueno, Miyagi (JP); Yuuki Oka, Miyagi (JP); Tetsuya Satoh, Miyagi (JP); Seiya Abe, Fukuoka (JP)

(72) Inventors: Tsuyoshi Ueno, Miyagi (JP); Yuuki Oka, Miyagi (JP); Tetsuya Satoh, Miyagi (JP); Seiya Abe, Fukuoka (JP)

(73) Assignees: RICOH COMPANY, LTD., Tokyo (JP); KYUSHU INSTITUTE OF TECHNOLOGY, Fukuoka (JP)

( * ) Notice: Subject to any disclaimer, the term of this patent is extended or adjusted under 35 U.S.C. 154(b) by 0 days.

(21) Appl. No.: 16/612,875

(22) PCT Filed: May 23, 2018

(86) PCT No.: PCT/JP2018/019894
§ 371 (c)(1),
(2) Date: Nov. 12, 2019

(87) PCT Pub. No.: WO2018/221356
PCT Pub. Date: Dec. 6, 2018

(65) Prior Publication Data
US 2020/0160777 A1    May 21, 2020

(30) Foreign Application Priority Data
May 31, 2017  (JP) .............................. JP2017-108138

(51) Int. Cl.
*H05B 45/30*      (2020.01)
*H05B 45/325*     (2020.01)
(Continued)

(52) U.S. Cl.
CPC .......... *H05B 45/375* (2020.01); *G09G 3/006* (2013.01); *G09G 3/32* (2013.01); *H05B 45/14* (2020.01);
(Continued)

(58) Field of Classification Search
CPC .. G09G 3/32; G09G 3/006; G09G 2310/0272; H05B 45/14; H05B 45/325;
(Continued)

(56) References Cited

U.S. PATENT DOCUMENTS

2008/0224625 A1* 9/2008 Greenfeld .......... H05B 45/3725
                                                  315/201
2011/0043117 A1* 2/2011 Kim ...................... H05B 45/20
                                                  315/161
(Continued)

FOREIGN PATENT DOCUMENTS

EP          2615887        7/2013
JP       2007-189004 A     7/2007
(Continued)

OTHER PUBLICATIONS

International Search Report dated Jul. 24, 2018 in PCT/JP2018/019894 filed on May 23, 2018.
(Continued)

*Primary Examiner* — Thai Pham
(74) *Attorney, Agent, or Firm* — Harness, Dickey & Pierce, P.L.C.

(57) ABSTRACT

A drive circuit 3 includes a power source 11; current control units 12-1 to 12-$n$ configured to control the amount of currents supplied to a light emitting element in accordance with a pulse modulation signal; and a calculation unit 13 configured to change a duty ratio of a pulse modulation signal. The current control units 12-1 to 12-$n$ include a first switching element 21 configured to be switched on/off in accordance with a pulse modulation signal; and a second switching element 22 configured to be switched on/off in accordance with an inversion signal of the pulse modulation signal input to the first switching element 21; and an inductor 23. The first switching element 21 and the inductor 23 are serially connected between the power source and the (Continued)

light emitting element. The second switching element 22 is connected between ground 25 and a contact point 24 of the first switching element 21 and the inductor 23. The two or more current control units 12-1 to 12-*n* are connected in parallel.

20 Claims, 18 Drawing Sheets

(51) Int. Cl.
*H05B 45/375* (2020.01)
*G09G 3/00* (2006.01)
*G09G 3/32* (2016.01)
*H05B 45/14* (2020.01)

(52) U.S. Cl.
CPC ... *H05B 45/325* (2020.01); *G09G 2310/0272* (2013.01); *G09G 2330/12* (2013.01); *Y02B 20/30* (2013.01)

(58) Field of Classification Search
CPC .. H05B 45/37; H05B 45/375; H05B 45/3725; H05B 45/50; H05B 45/30
See application file for complete search history.

(56) References Cited

U.S. PATENT DOCUMENTS

| | | | |
|---|---|---|---|
| 2013/0038234 A1 | 2/2013 | Van Der Veen et al. | |
| 2013/0076259 A1* | 3/2013 | Oshima | H05B 45/3725 |
| | | | 315/209 R |
| 2013/0176296 A1* | 7/2013 | Cho | G09G 3/32 |
| | | | 345/213 |
| 2018/0269651 A1* | 9/2018 | Oka | H02M 1/32 |
| 2018/0278018 A1 | 9/2018 | Tsuda et al. | |

FOREIGN PATENT DOCUMENTS

| | | |
|---|---|---|
| JP | 2012-48984 A | 3/2012 |
| JP | 2012-134281 | 7/2012 |
| JP | 2013-46541 A | 3/2013 |
| JP | 5435500 | 3/2014 |
| JP | 6009132 | 10/2016 |
| JP | 2016-189670 A | 11/2016 |
| JP | 2018-157695 | 10/2018 |

OTHER PUBLICATIONS

Japanese Office Action dated Mar. 23, 2021, corresponding to JP Application No. 2017-108138.

* cited by examiner

[Fig. 1]
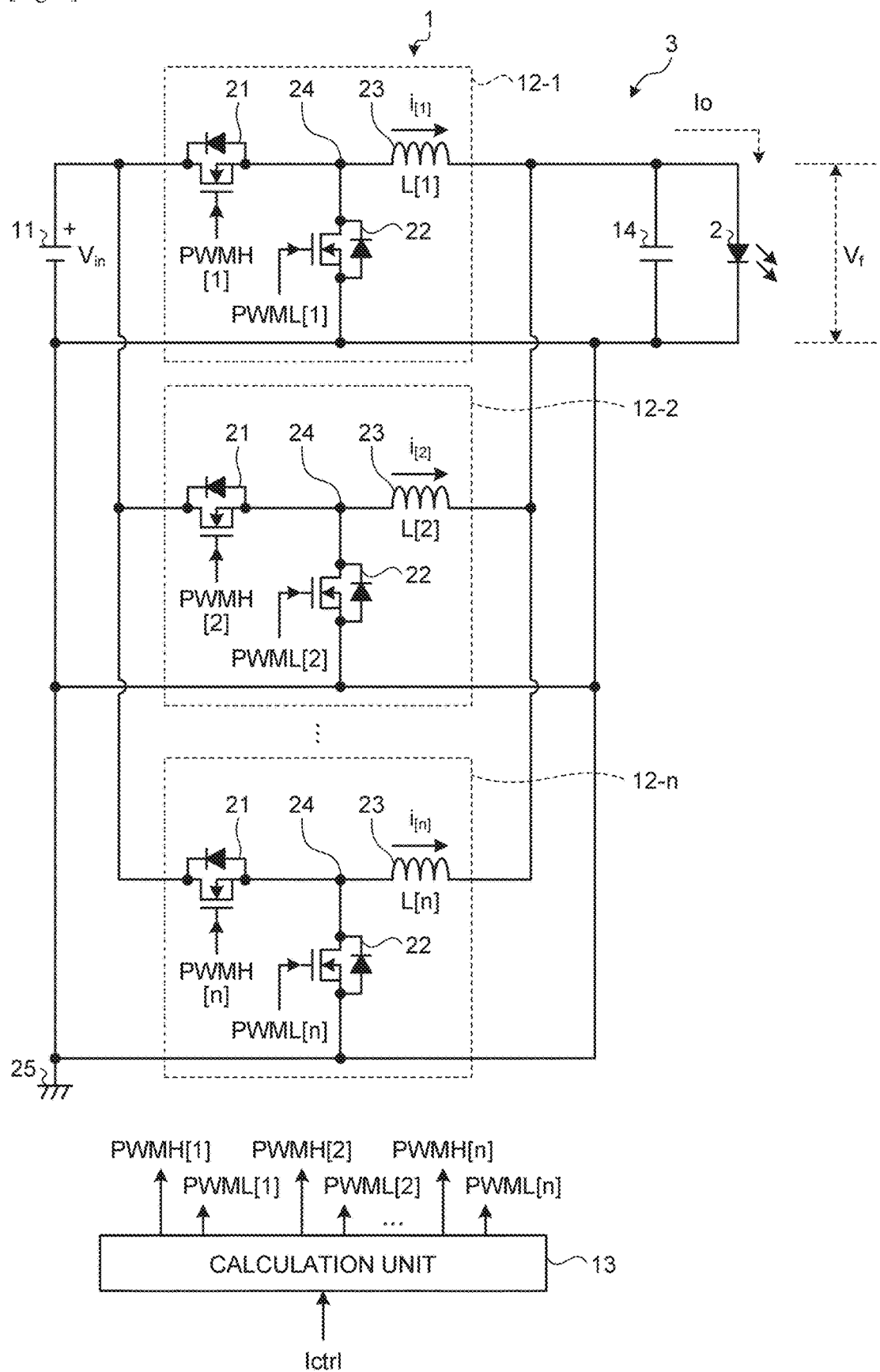

[Fig. 2]
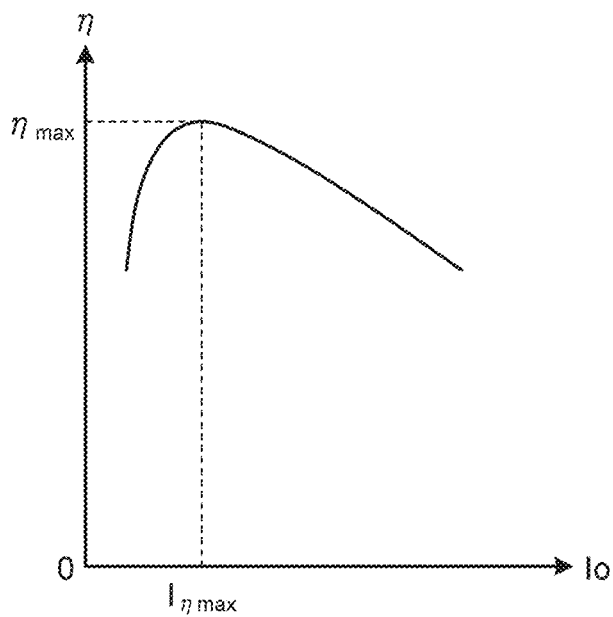
[Fig. 3]
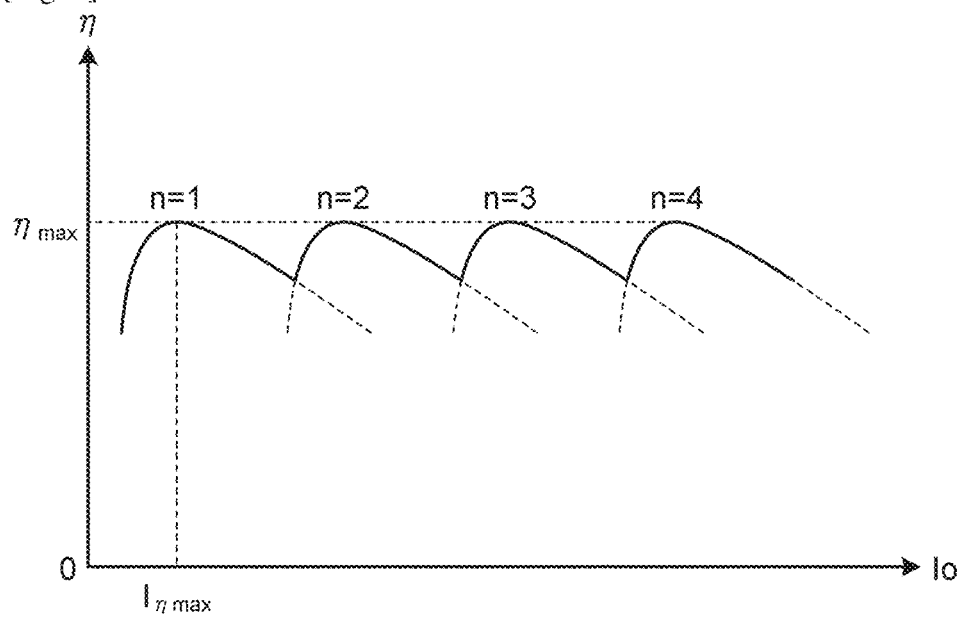

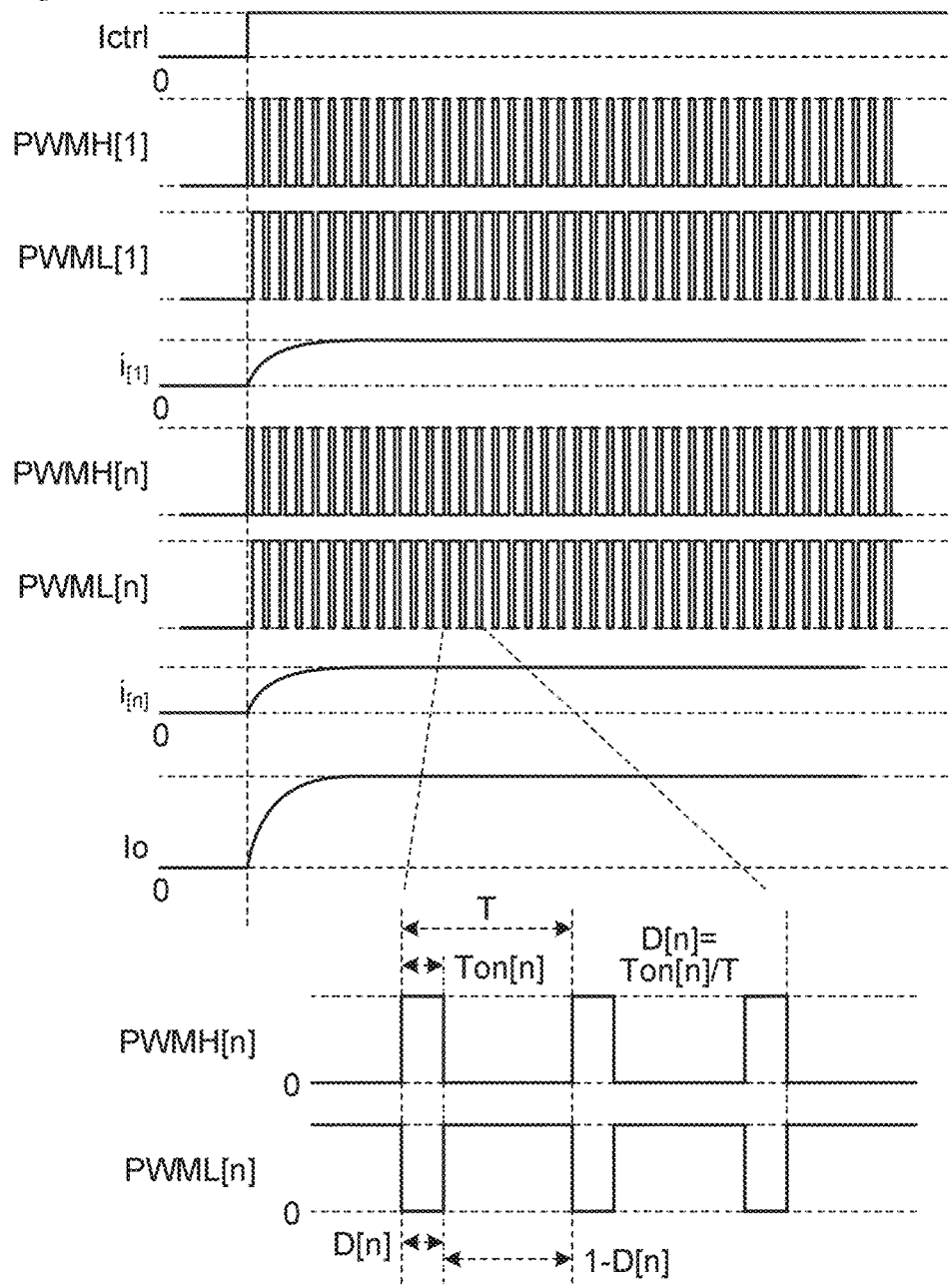

[Fig. 5]
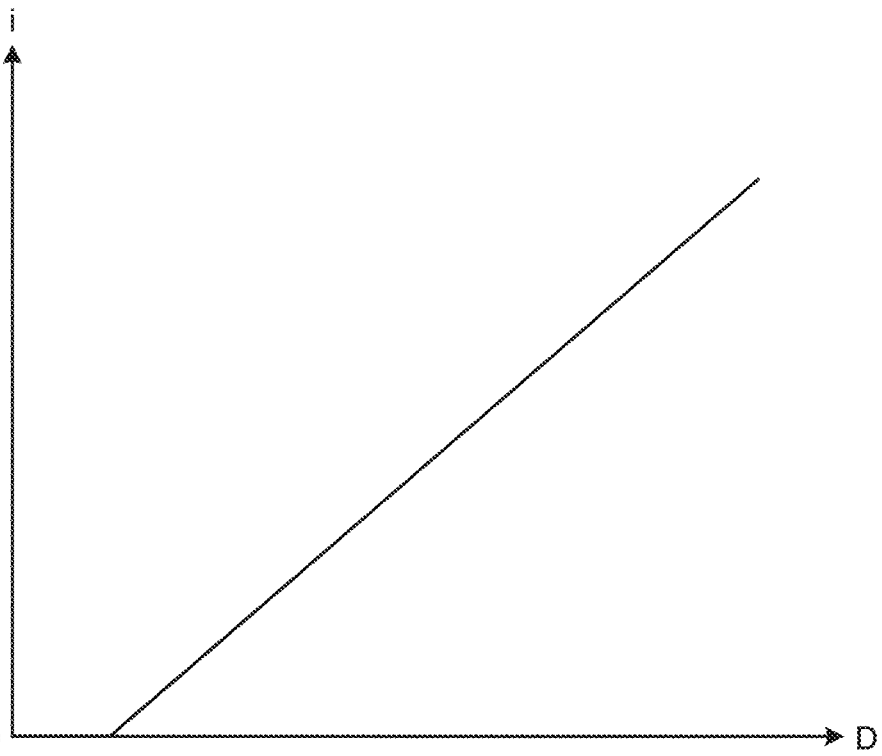
[Fig. 6]
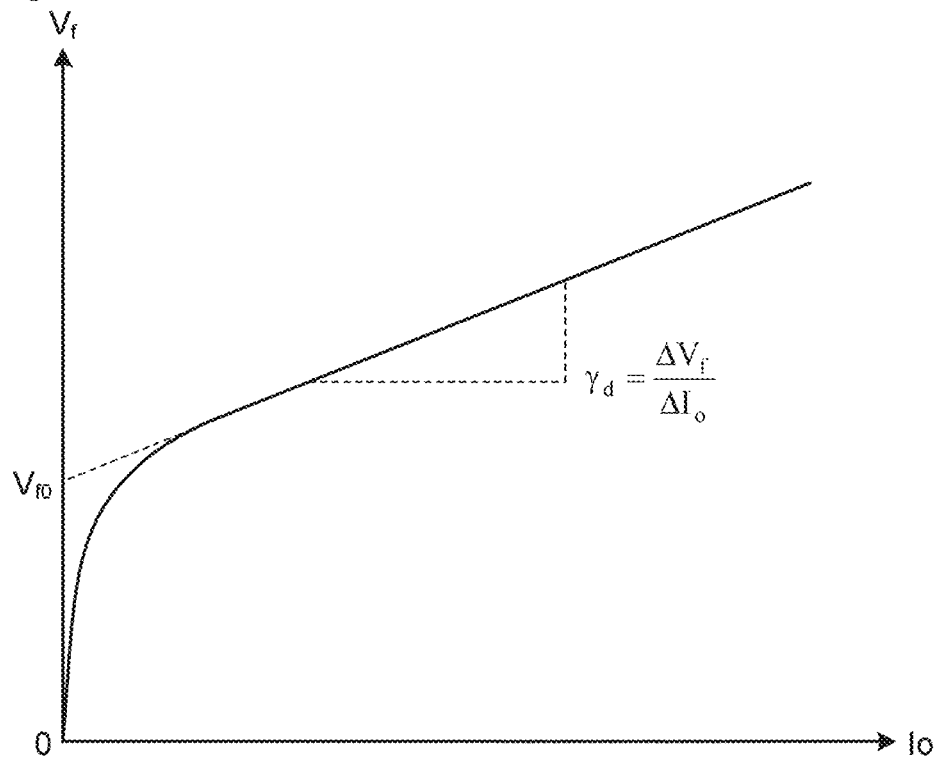

[Fig. 7]
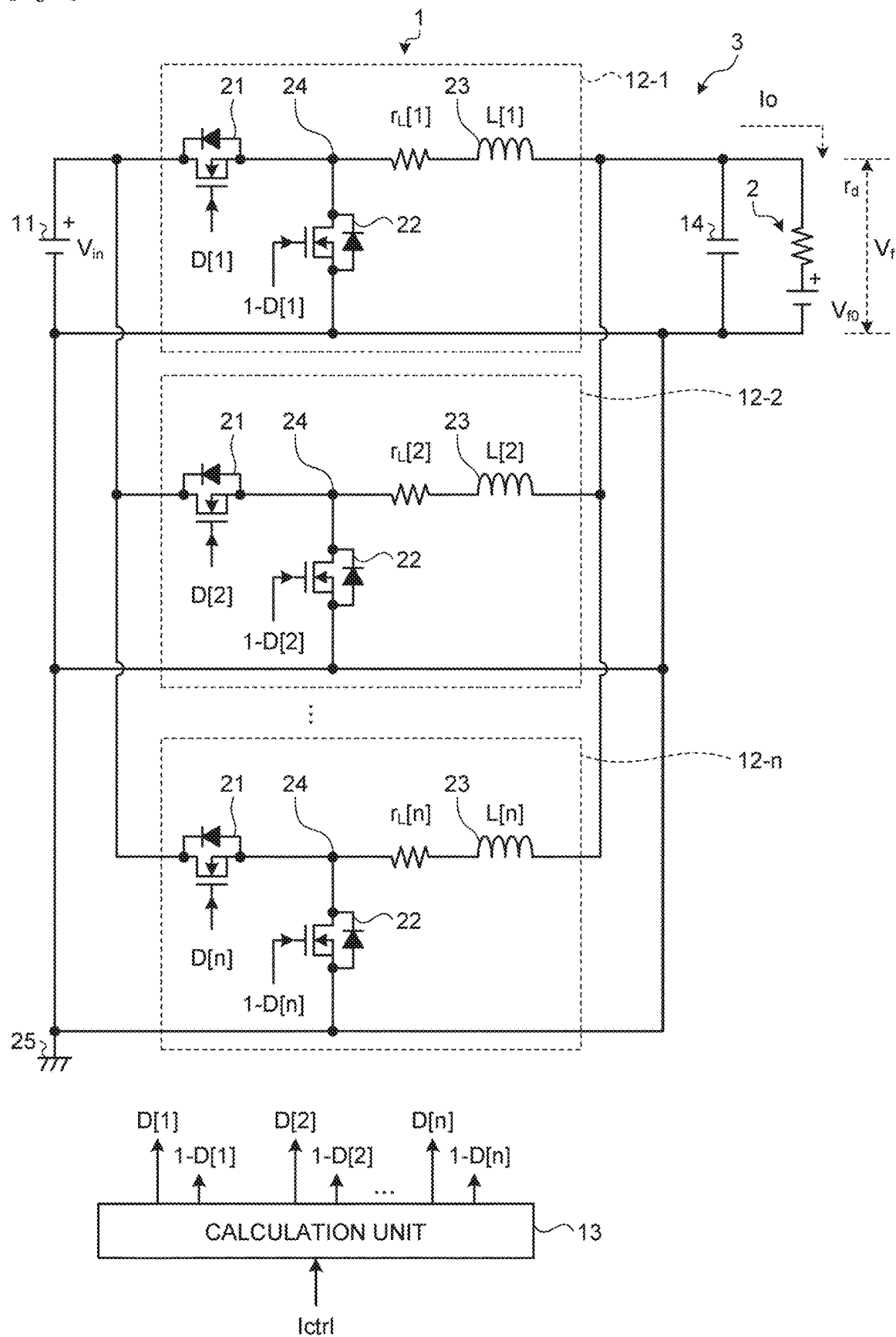

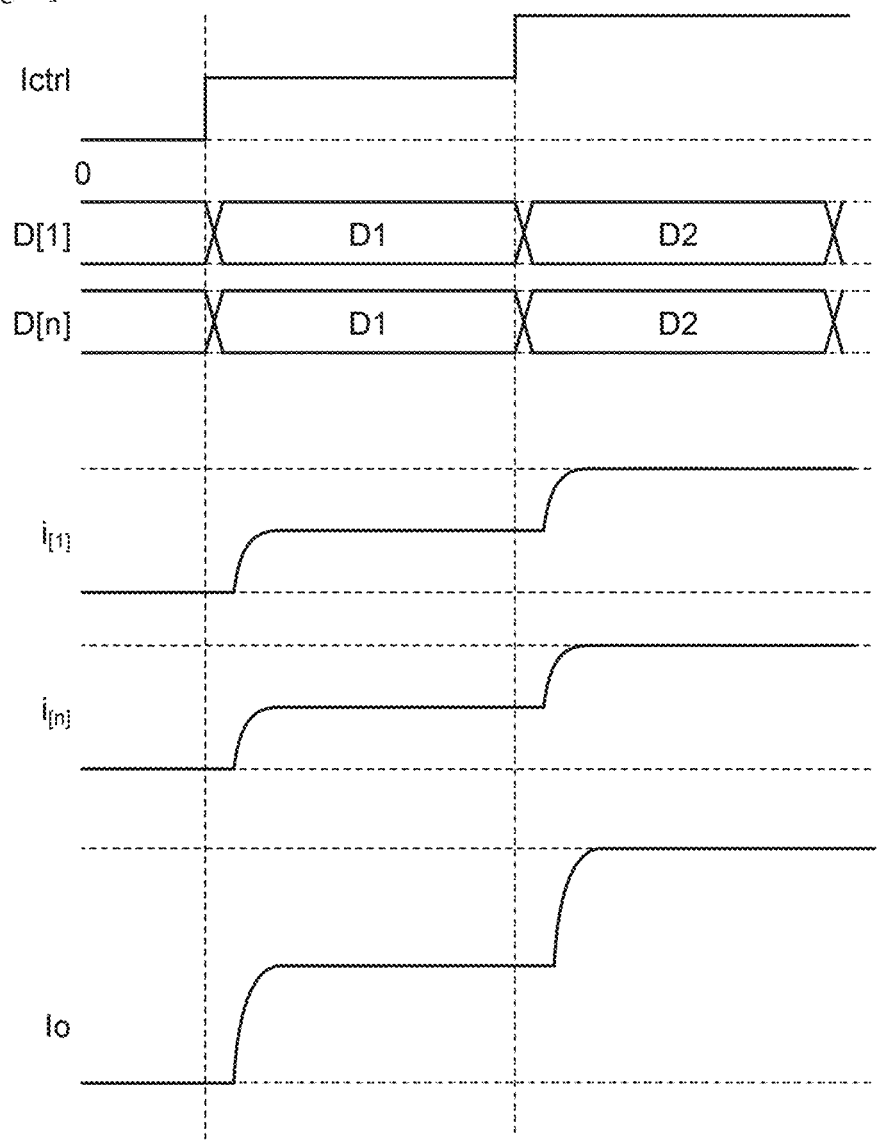
[Fig. 8]

[Fig. 9]
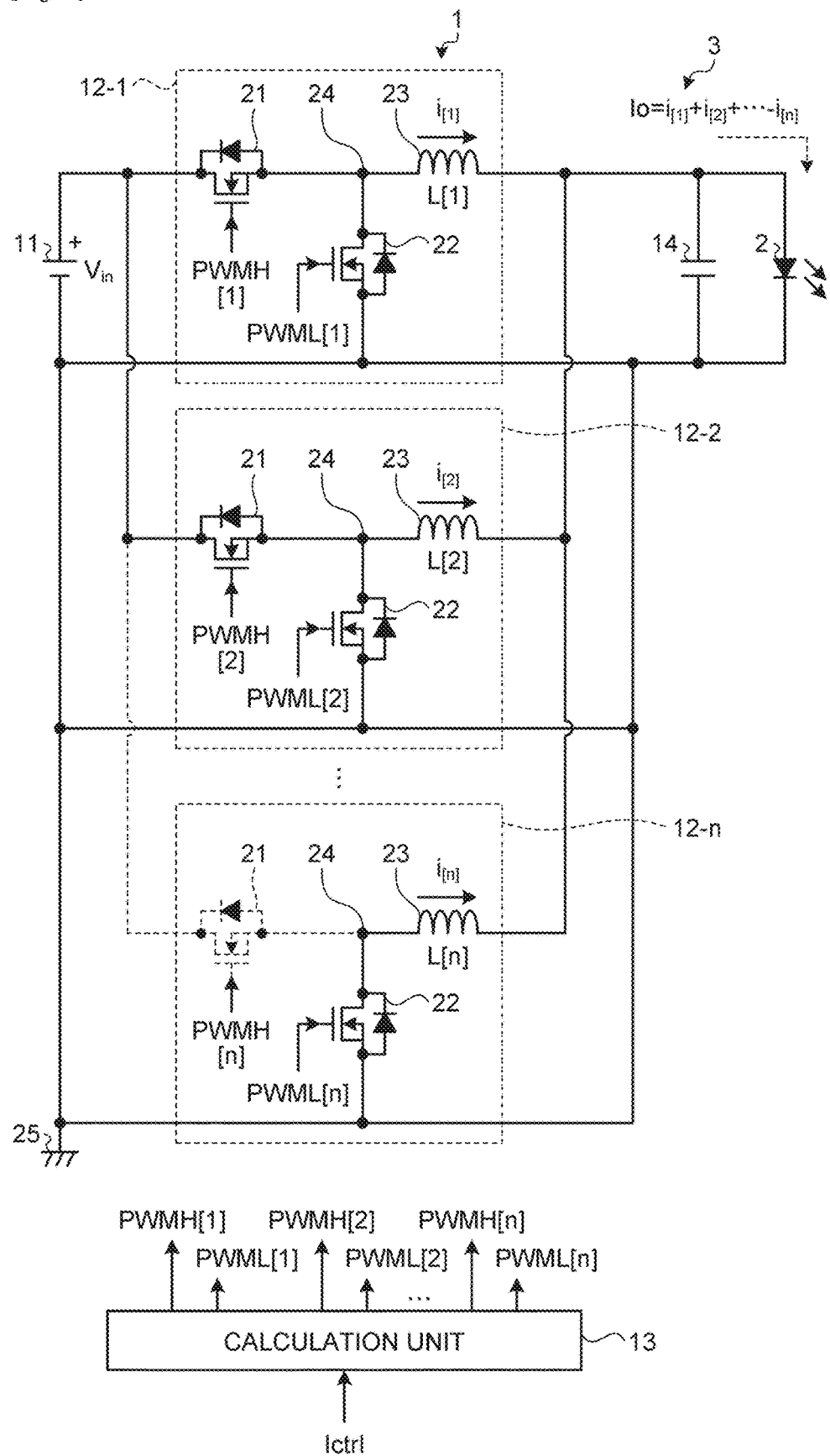

[Fig. 10]
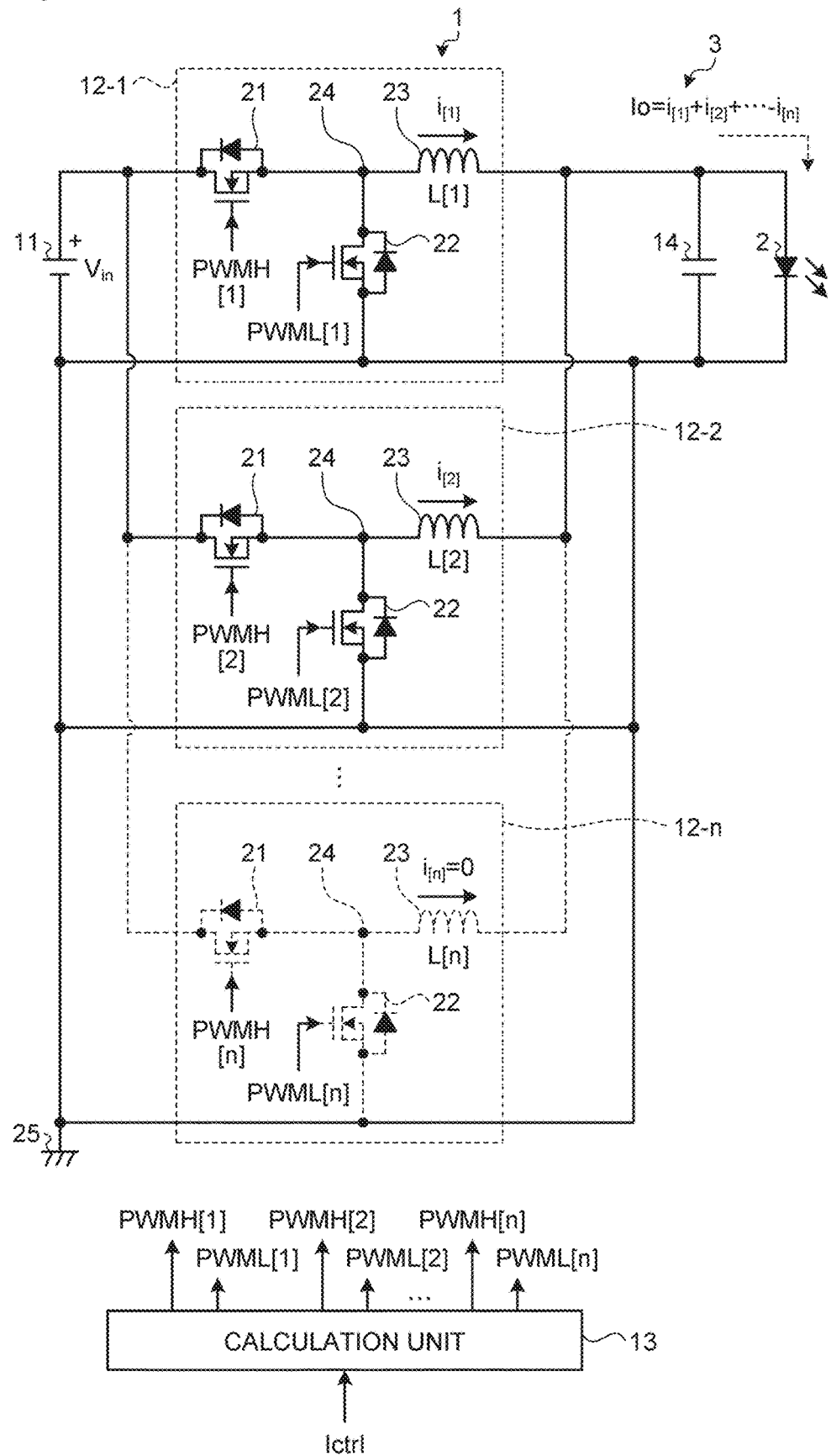

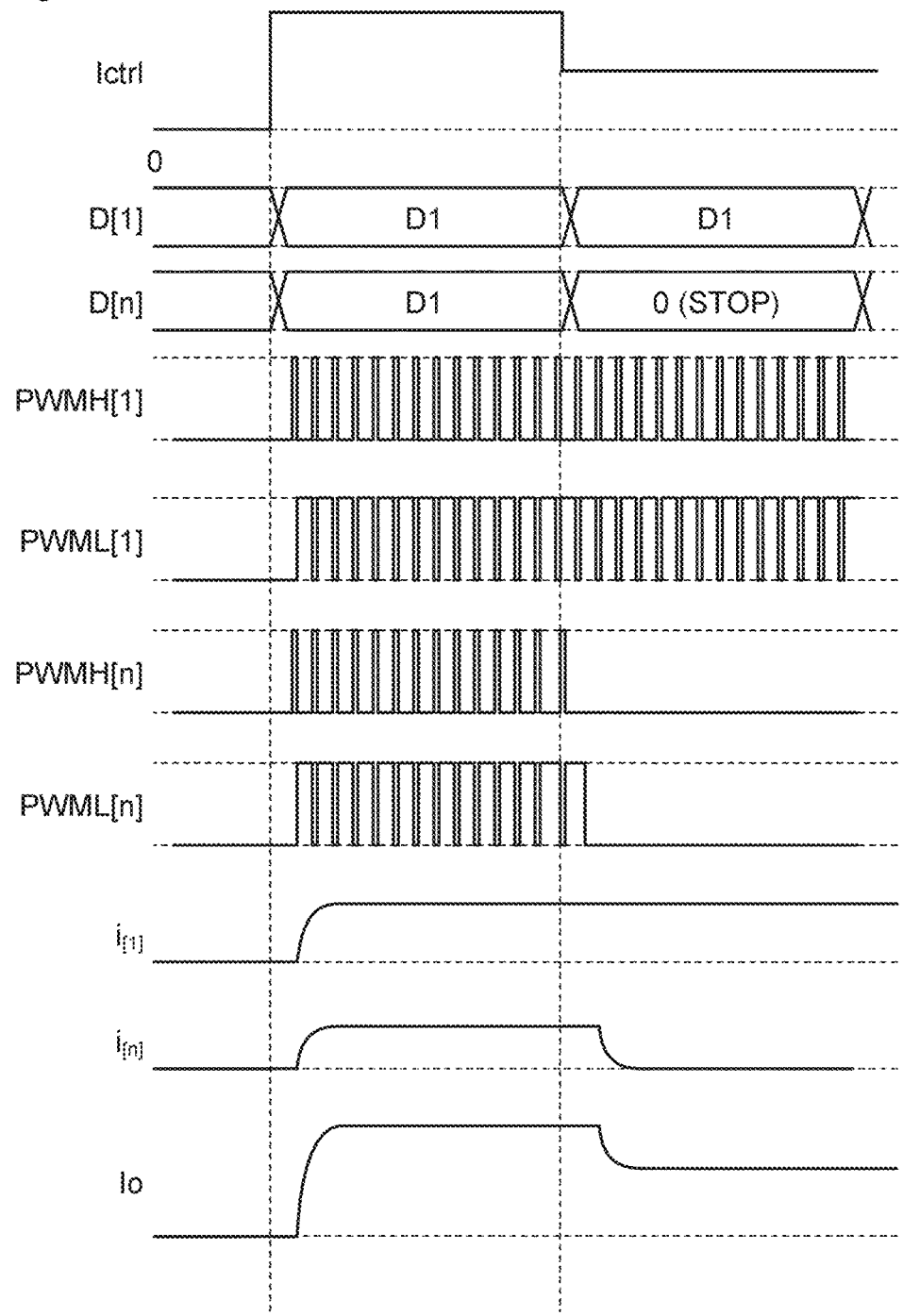
[Fig. 11]

[Fig. 12]
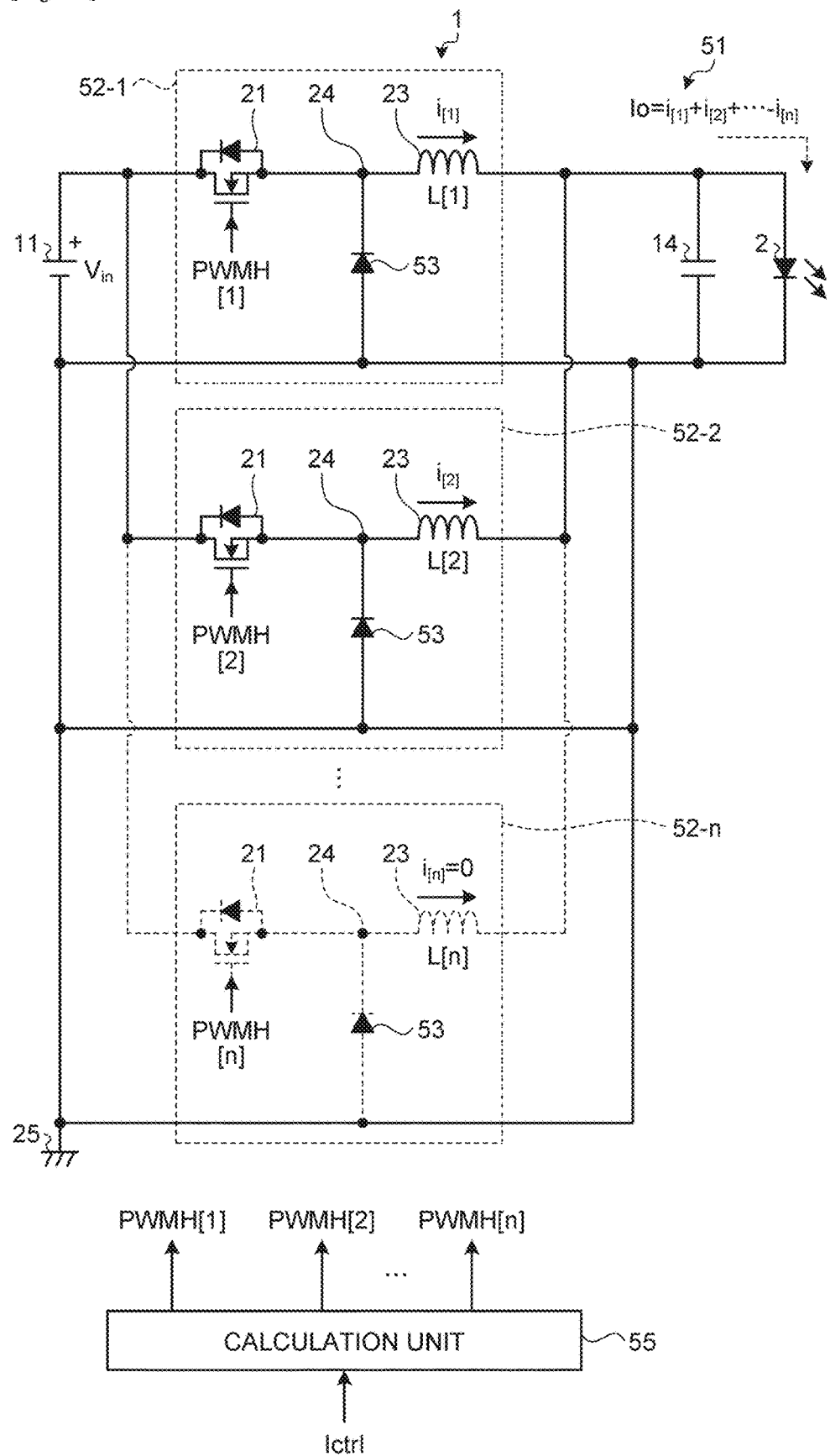

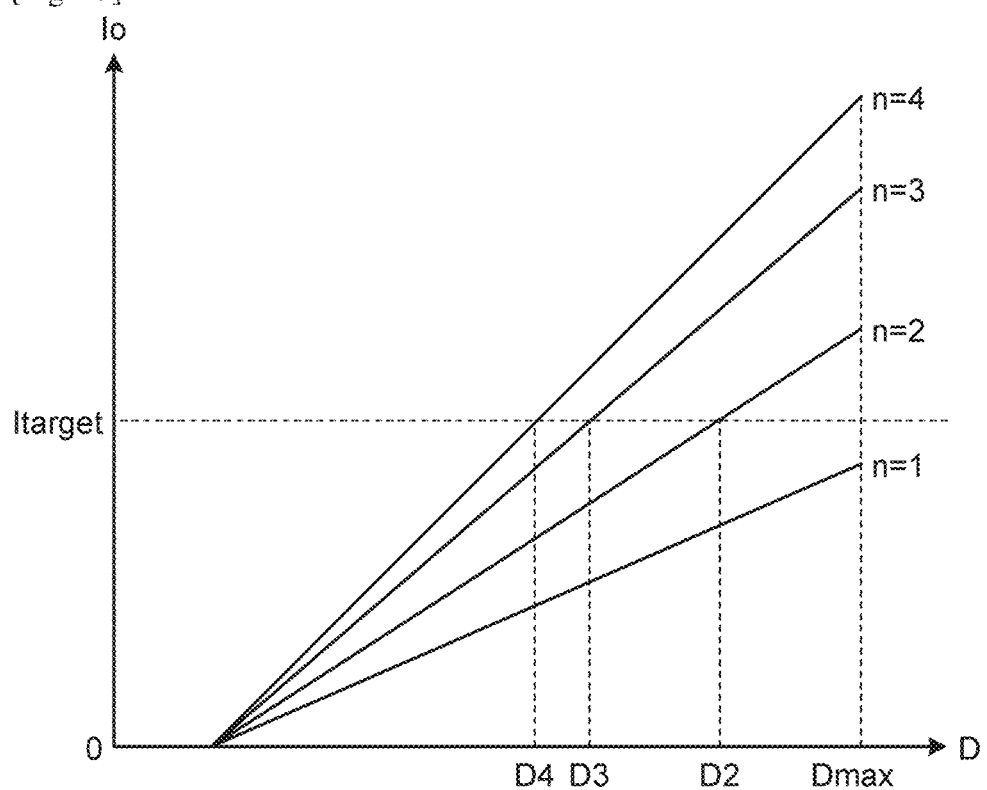
[Fig. 13]

[Fig. 14]
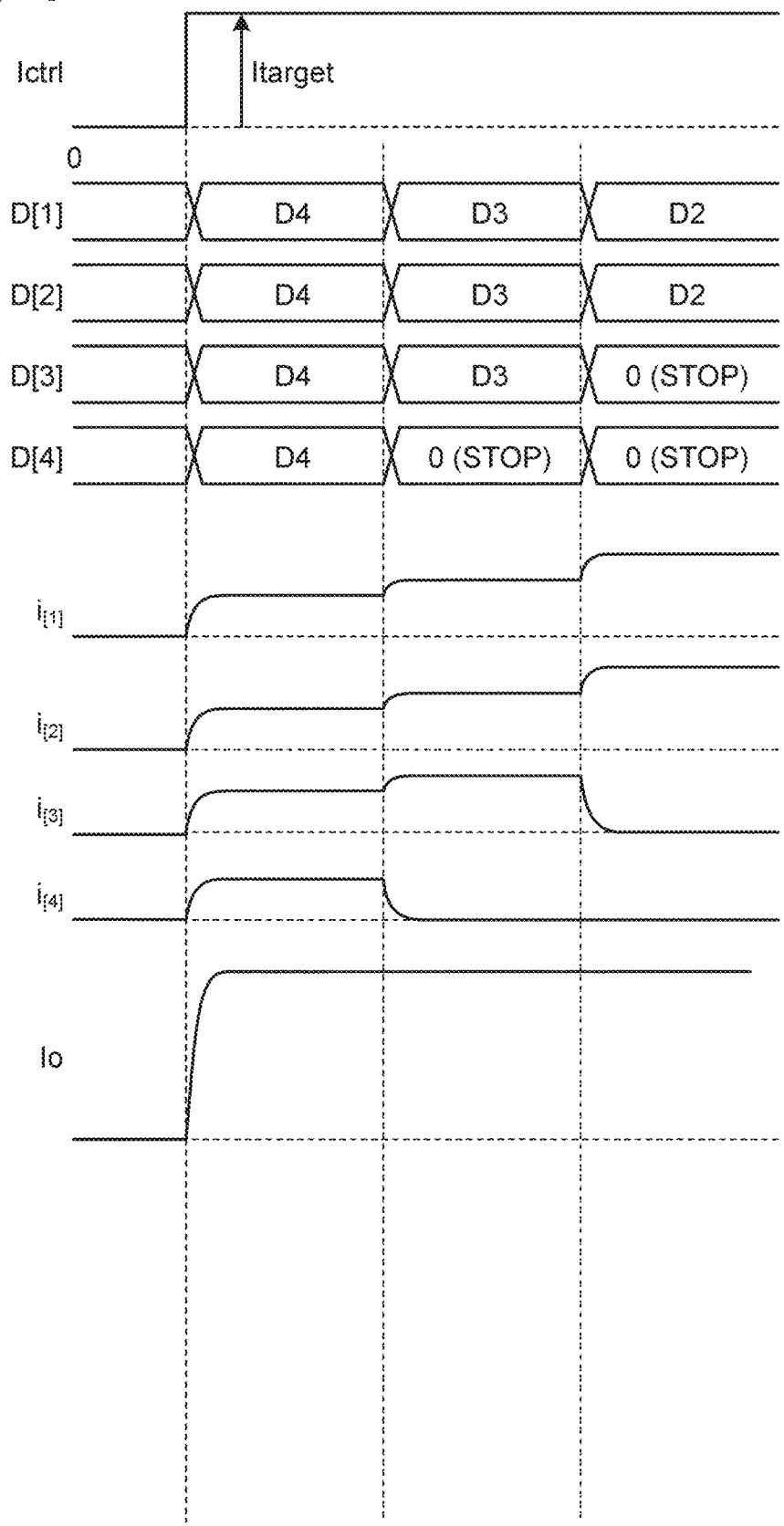

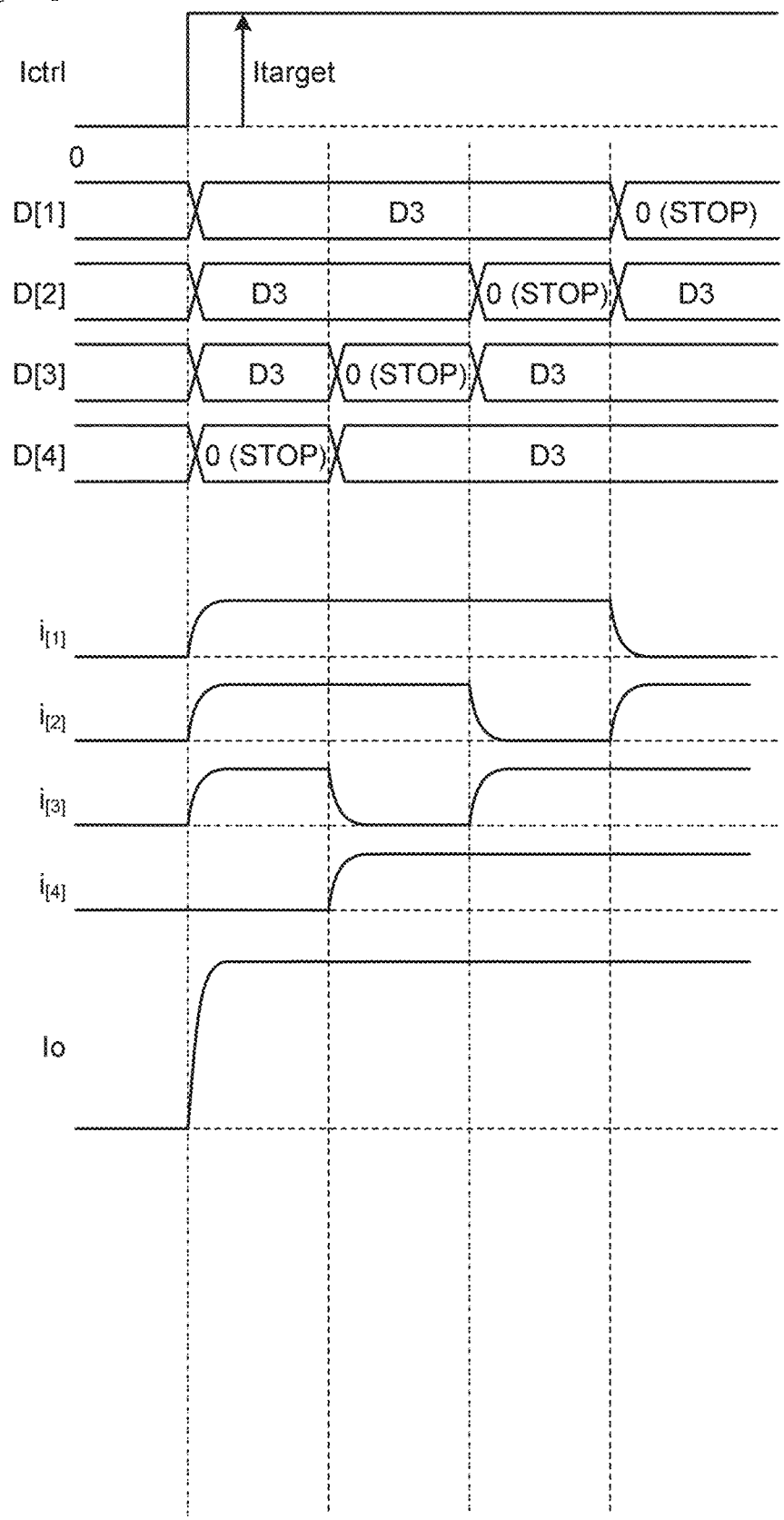
[Fig. 15]

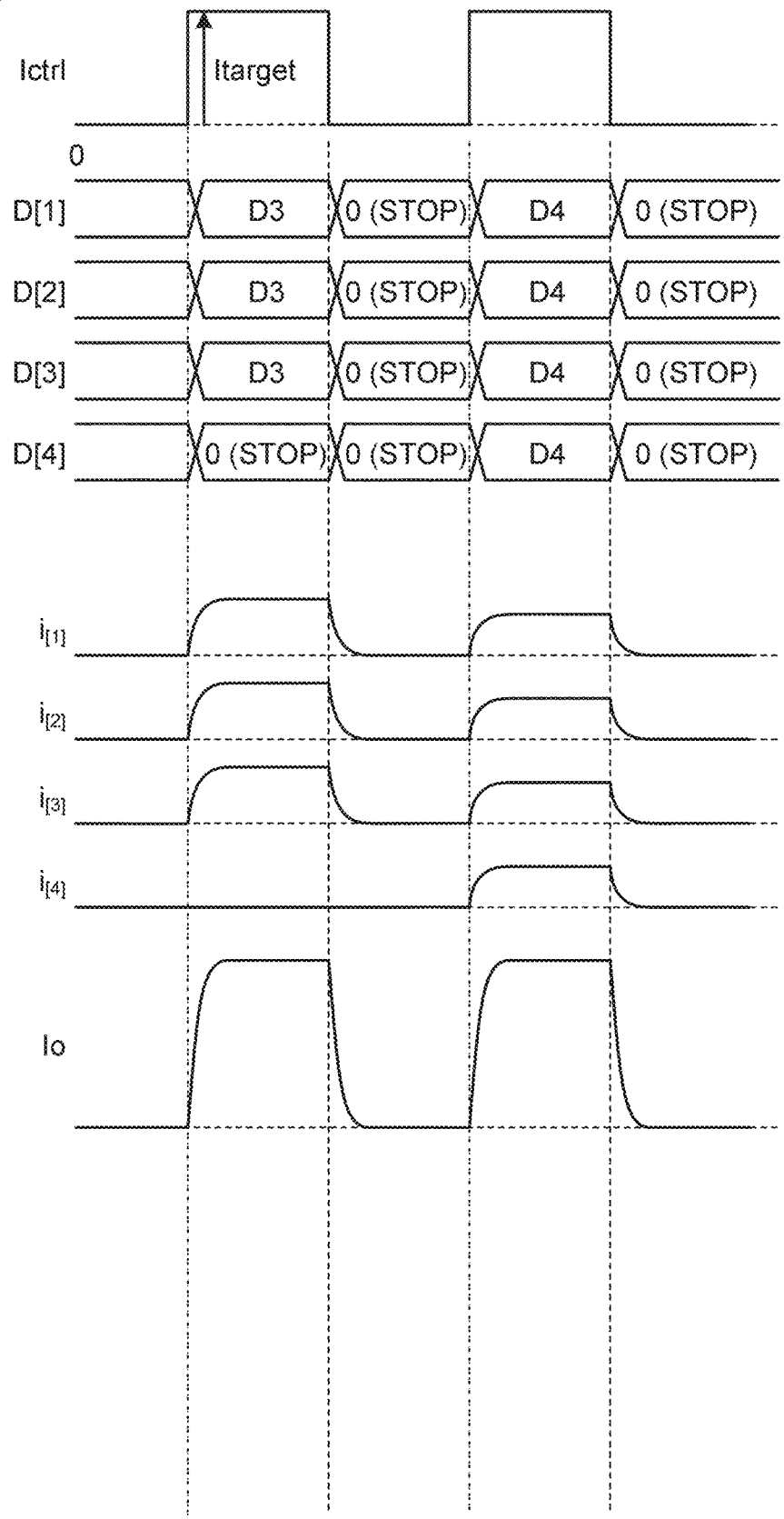
[Fig. 16]

[Fig. 17]
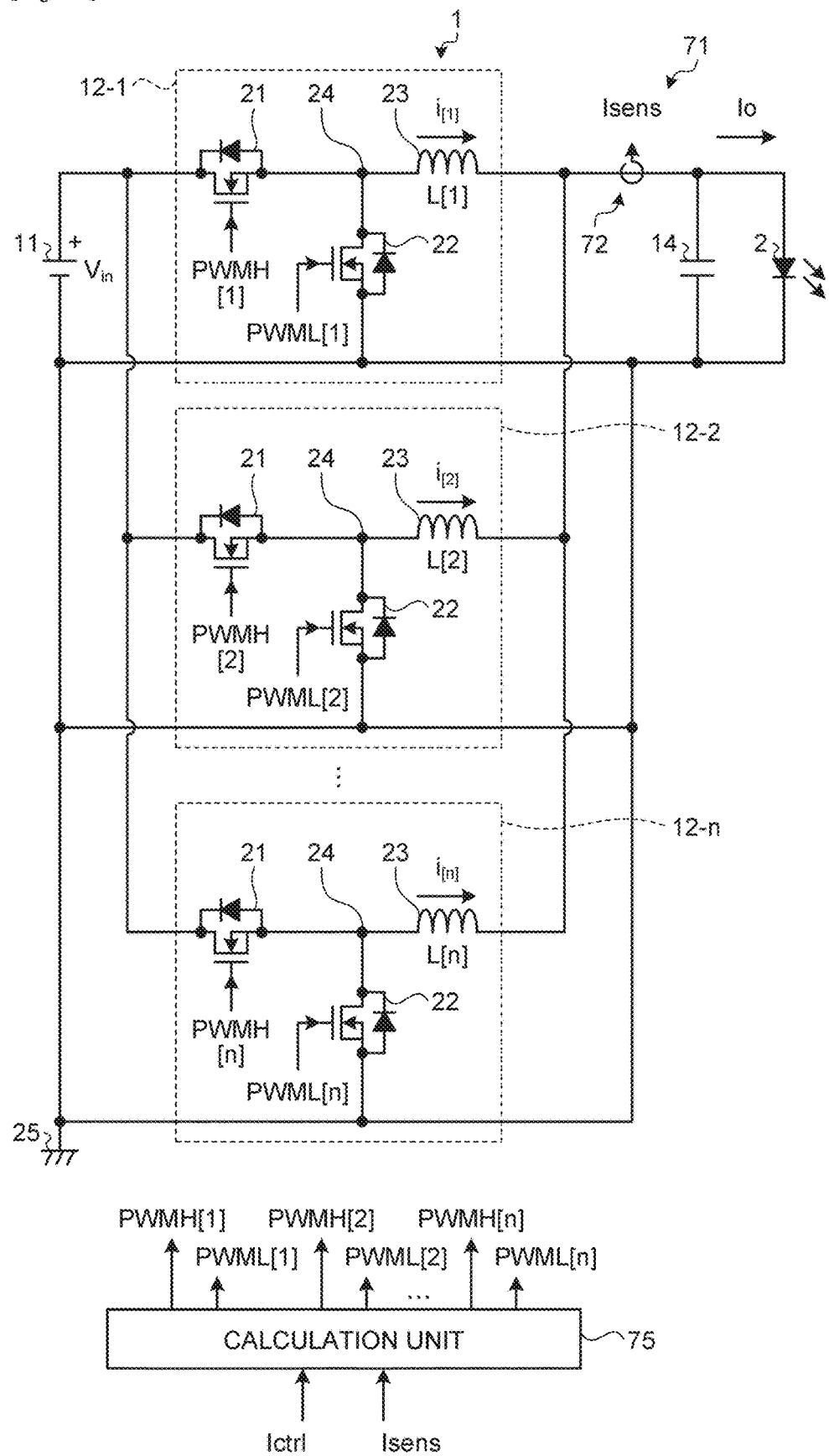

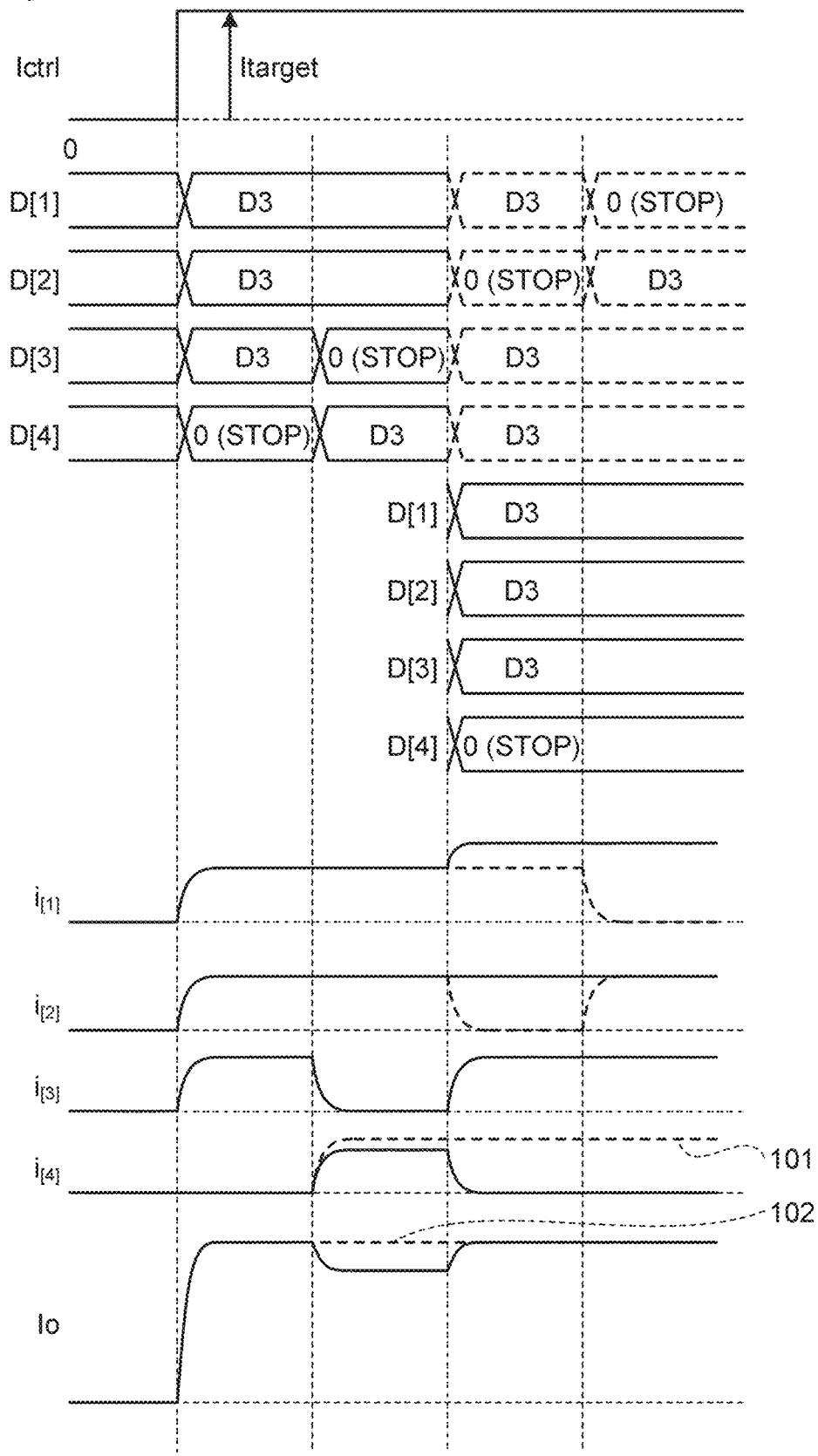
[Fig. 18]

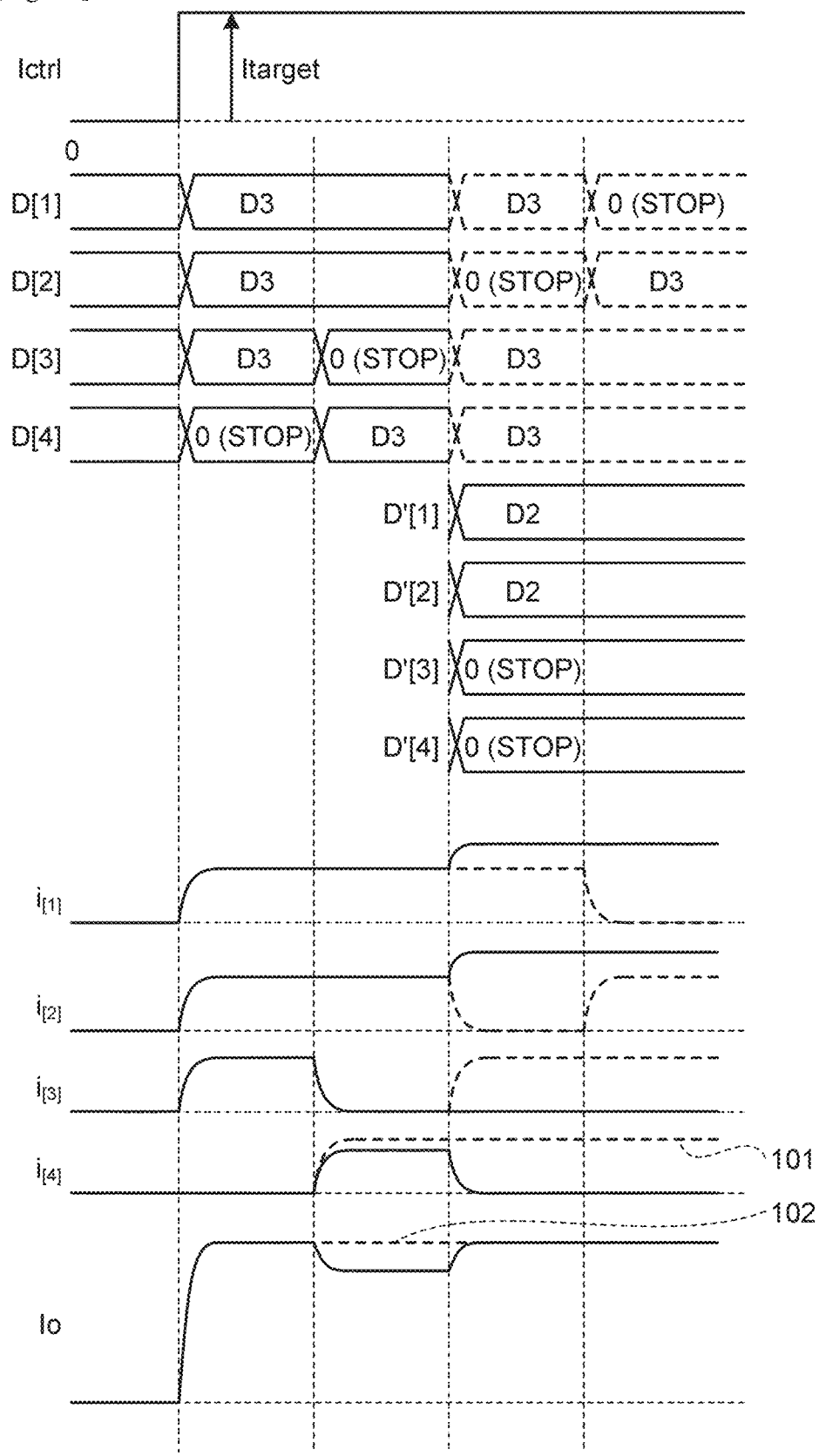
[Fig. 19]

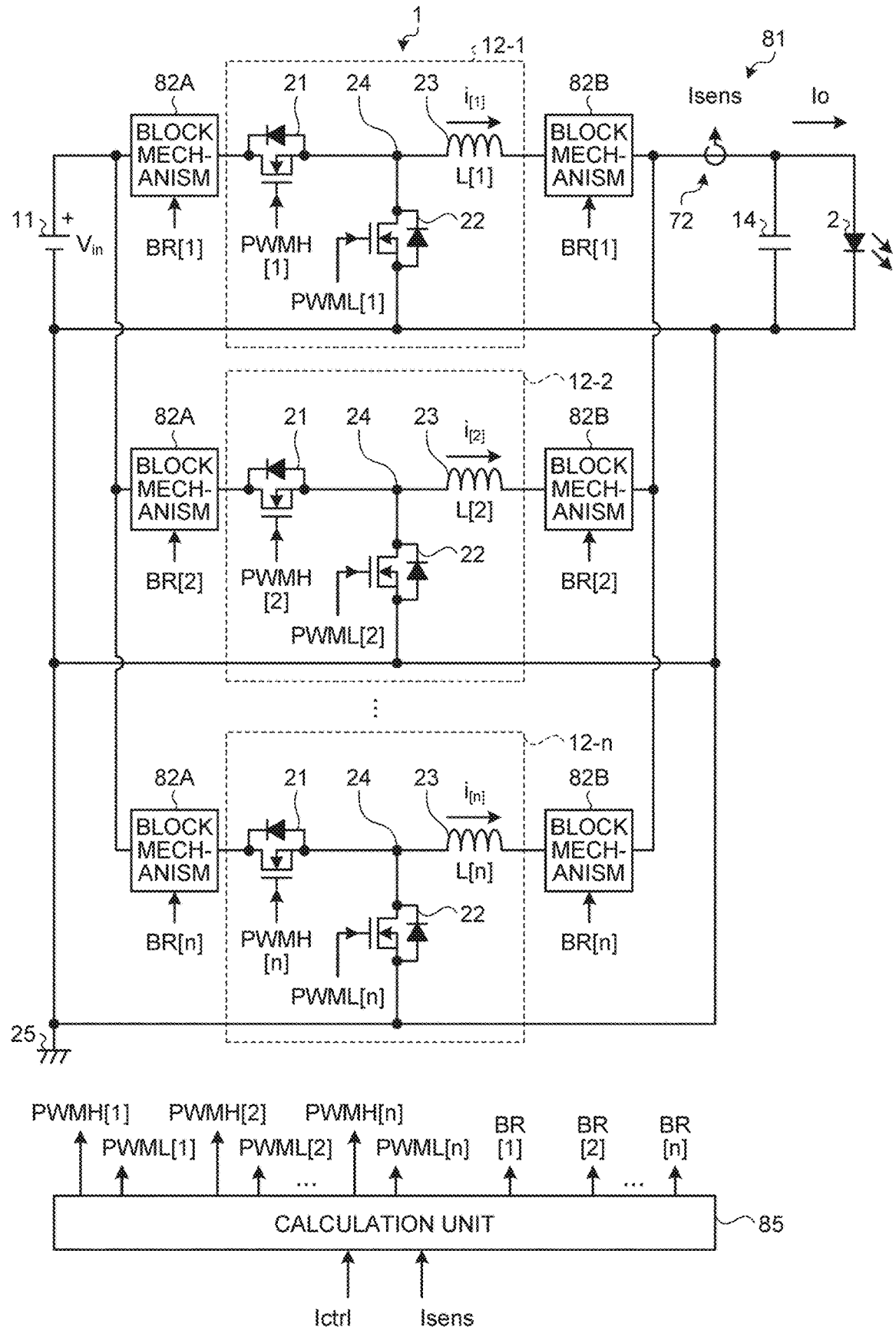
[Fig. 20]

DRIVE CIRCUIT AND LIGHT EMITTING DEVICE

TECHNICAL FIELD

The present invention relates to a drive circuit and a light emitting device.

BACKGROUND ART

Light emitting devices drive a light emitting element such as a laser diode (hereafter, abbreviated as LD) or LED (Light Emitting Diode), and they include a drive circuit that supplies a drive current to the light emitting element. Drive circuits have a known configuration such that, for example, a constant-voltage source, a light emitting element, a switching element (e.g., MOSFET (Metal-Oxide-Semiconductor Field-Effect Transistor) or a bipolar transistor) are connected and the value of current supplied to the light emitting element is controlled. Optical output of the light emitting element is determined in accordance with the value of current flowing into the PN junction area of a semiconductor inside the light emitting element. Drive currents are supplied as direct currents or as pulses depending on a use application.

Known methods for controlling the current value of a drive current include a continuous control method (sometimes referred to as an analog control method, a linear method, a drop method, a dropper method, or the like) for continuously controlling a gate voltage of a switching element by using an analog control signal; and a switching control method for switching on/off a gate voltage of a switching element by using a pulse modulation signal. According to the continuous control method, for example, a constant-voltage source, a light emitting element, and a switching element are connected in series, and the gate voltage of the switching element is controlled in a continuous manner. Thus, the switching element is used as a pseudo variable resistance so that the current value of a drive current is controlled. According to the switching control method, for example, an inductor is provided among a constant-voltage source, a light emitting element, and switching elements and the switching elements are turned on/off at an appropriate duty ratio by using a pulse modulation signal so that the current value of the drive current is controlled. Furthermore, diode rectification is known in which one of the switching elements is replaced with a diode in a switching method. The switching control method is advantageous in electric-power conversion efficiency, size, and the like, as typically it has little circuit loss than the continuous control method.

There is a disclosure of the configuration of a drive circuit using a switching control method, including a current output unit that controls a switching element inside a step-down chopper unit that reduces a direct-current voltage such that a detected current value matches a designated current value, the switching element being connected to the light emitting unit in parallel (PTL 1).

SUMMARY OF INVENTION

Technical Problem

If an inductor is used in a switching control method, there is a need to make consideration to prevent the occurrence of magnetic saturation in the inductor. If magnetic saturation occurs in the inductor (for example, if the magnetic flux density of the core material of a coil reaches a saturation magnetic flux density), inductance rapidly decreases, and the amount of current flowing from the inductor rapidly increases; therefore, the current flowing into the switching element connected to the inductor exceeds the rated one, which may result in damages to the switching element. Therefore, it is necessary to use an inductor with a large saturation magnetic flux density to prevent the occurrence of magnetic saturation so that the current value of the output current supplied to a light emitting element becomes larger. To increase a saturation magnetic flux density, there is a need to increase a magnetic path length (raise a core volume), and therefore the size of the inductor becomes larger.

The present invention has been made in consideration of the foregoing, and it has an object to increase an output current without increasing the size of an inductor.

Solution to Problem

According to an embodiment, provided is a drive circuit configured to generate an output current for driving a light emitting element, including: a power source; a current control unit configured to control an amount of current supplied to the light emitting element in accordance with a pulse modulation signal; and a calculation unit configured to change a duty ratio of the pulse modulation signal, wherein the current control unit includes a first switching element configured to be switched on/off in accordance with the pulse modulation signal, a second switching element configured to be switched on/off in accordance with an inversion signal of the pulse modulation signal input to the first switching element, and an inductor, the first switching element and the inductor are serially connected between the power source and the light emitting element, the second switching element is connected between ground and a contact point of the first switching element and the inductor, and the two or more current control units are connected in parallel.

Advantageous Effects of Invention

According to the present invention, it is possible to increase an output current without increasing the size of an inductor.

BRIEF DESCRIPTION OF DRAWINGS

FIG. 1 is a diagram that illustrates a configuration of a light emitting device according to a first embodiment.

FIG. 2 is a graph that illustrates the relation between the output current and electric-power conversion efficiency in a voltage conversion circuit with a switching control method.

FIG. 3 is a graph that illustrates the relation between the output current and electric-power conversion efficiency when four voltage conversion circuits with the same switching control method are arranged in parallel.

FIG. 4 is a timing chart that illustrates the relation among the target current value, the timing signals, the inductor current, and the output current according to the first embodiment.

FIG. 5 is a graph that illustrates the relation between the duty ratio of the timing signal and the inductor current according to the first embodiment.

FIG. 6 is a graph that illustrates the relation between the output current and a forward voltage of an LD according to the first embodiment.

FIG. 7 is a diagram that illustrates a state where duty ratios, inductance, control-unit internal resistances, a forward voltage, an LD internal resistance, and a threshold voltage are described in the configuration diagram of the light emitting device illustrated in FIG. 1.

FIG. 8 is a diagram that illustrates the relation among the target current value with regard to the light emitting device according to the first embodiment, the duty ratio, the inductor current, and the output current.

FIG. 9 is a diagram that illustrates a state where a first switching element in an n-th current control unit according to the first embodiment is off and a second switching element is on.

FIG. 10 is a diagram that illustrates a state where the first switching element and the second switching element in the n-th current control unit according to the first embodiment are off.

FIG. 11 is a timing chart that illustrates the relation among the target current value, the duty ratio, the timing signals, the inductor current, and the output current in the state illustrated in FIG. 10.

FIG. 12 is a diagram that illustrates a configuration of the light emitting device according to a modification of the first embodiment.

FIG. 13 is a graph that illustrates the relation among the duty ratio, the output current, and the number of current control units to be driven according to the first embodiment.

FIG. 14 is a timing chart that illustrates control if the number of four current control units to be driven is sequentially decreased according to the first embodiment.

FIG. 15 is a timing chart that illustrates control if the four current control units according to the first embodiment are sequentially stopped one by one.

FIG. 16 is a timing chart that illustrates control if the target current value is periodically changed according to the first embodiment.

FIG. 17 is a diagram that illustrates a configuration of the light emitting device according to a second embodiment.

FIG. 18 is a timing chart that illustrates operation when a drive circuit according to a second embodiment performs a failure detection function.

FIG. 19 is a timing chart that illustrates operation when the drive circuit according to the second embodiment performs a failure handling function.

FIG. 20 is a diagram that illustrates a configuration of the light emitting device according to a third embodiment.

DESCRIPTION OF EMBODIMENTS

With reference to the attached drawings, a detailed explanation is given below of embodiments of a drive circuit and a light emitting device. The present invention is not limited to the embodiments below, and components in the embodiments below include the ones that may be easily developed by a person skilled in the art, substantially the same ones, and the ones in what is called a range of equivalents. The components may be variously omitted, replaced, modified, or combined without departing from the scope of the embodiments below.

First Embodiment

FIG. 1 is a diagram that illustrates a configuration of a light emitting device 1 according to a first embodiment. The light emitting device 1 includes an LD 2 (light emitting element) and a drive circuit 3. The LD 2 is a light emitting element that is driven with an output current $I_o$ output from the drive circuit 3.

The drive circuit 3 according to the present embodiment includes a direct-current power source 11 (power source), multiple current control units 12-1 to 12-n, a calculation unit 13, and a capacitor 14. The drive circuit 3 is a circuit that generates the output current $I_o$ by using a switching control method.

The direct-current power source 11 conducts voltage conversion on the AC voltage supplied from a commercial outlet, or the like, or the DC voltage supplied from a battery, or the like, in accordance with the voltage used by the drive circuit 3. The direct-current power source 11 generates an input voltage $V_{in}$.

The two or more current control units 12-1 to 12-n are connected in parallel between the direct-current power source 11 and the LD 2. The current control units 12-1 to 12-n are circuits that control the amount of the output current $I_o$ in accordance with pulse modulation signals. Each of the current control units 12-1 to 12-n includes a first switching element 21, a second switching element 22, and an inductor 23. The first switching element 21 and the inductor 23 are serially connected between the direct-current power source 11 and the LD 2. The second switching element 22 is connected between a ground 25 and a contact point 24 of the first switching element 21 and the inductor 23.

The first switching element 21 and the second switching element 22 according to this example are n-type MOSFET whose on/off state is switched by timing signals PWMH, PWML that are pulse modulation signals output from the calculation unit 13. The first switching element 21 is controlled by the timing signal PWMH, and the second switching element 22 is controlled by the timing signal PWML that is an inversion signal of the timing signal PWMH. Here, the timing signal PWMH and the timing signal PWML do not always have an inversion relation and for example the signals PWMH, PWML sometimes have an identical potential at the same time.

The calculation unit 13 is a circuit that outputs the timing signals PWMH, PWML (pulse modulation signals) for controlling the gate voltages of the first switching element 21 and the second switching element 22. The calculation unit 13 controls the pulse width (duty ratio) of the timing signals PWMH, PWML in accordance with the target current value of the output current $I_o$. The calculation unit 13 may be configured by using, for example, a voltage control IC (integrated circuit), a current control IC, a microcomputer, or FPGA (Field-Programmable Gate Array). The microcomputer and the FPGA may be configured by using a CPU (Central Processing Unit), a ROM (Read Only Memory) that stores programs for controlling the CPU, a RAM (Random Access Memory) that is a work area for the CPU, or the like.

The inductor 23 has a function to store currents output from the first switching element 21 and smooth the output current $I_o$. The inductor 23 needs to be used in such a range that no magnetic saturation occurs. This is because if magnetic saturation occurs in the inductor 23, i.e., if the magnetic flux density of the core material reaches a saturation magnetic flux density, the inductance rapidly decreases, and the amount of inductor currents i[1] to i[n] flowing from the inductor 23 rapidly increases so that the current flowing into an element (the first switching element 21, the second switching element 22, or the like) connected to the inductor 23 exceeds the rated one, which may result in damages to the elements.

In order to supply a sufficient amount of the output current $I_o$ to the LD 2, the core of the inductor 23 needs to be selected so that the magnetic flux density does not exceed a saturation magnetic flux density while the desired inductance is obtained. The following Equation (1) and Equation (2) are provided where the inductor current is i, the inductance is L, the magnetic flux density is B, the saturation magnetic flux density is $B_{max}$, the number of turns of the core is N, the magnetic path length is $l_e$, the cross-sectional area of the inductor (coil) 23 is $A_e$, and the magnetic permeability is µ.

$$L = N^2 \cdot \frac{\mu \cdot A_e}{l_e} \tag{1}$$

$$\beta = N \cdot i \cdot \frac{\mu}{l} \leq B_{max} \tag{2}$$

The inductance L is proportional to the square of the number of turns N, and the number of turns N needs to be increased to obtain the desired inductance L. However, as the magnetic flux density B is defined by the product of the number of turns N and the inductor current i, an increase in the number of turns N and an increase in the inductor current i cause the saturation magnetic flux density $B_{max}$ to be exceeded, which results in core saturation. Furthermore, as the inductor current i increases, loss (copper loss) caused due to resistance of a winding wire itself increases, and the temperature of the inductor 23 rises. An increase in the temperature of the inductor 23 causes a decrease in the saturation magnetic flux density $B_{max}$. Therefore, to prevent magnetic saturation while the desired inductance L is obtained, there is a need to increase the magnetic path length $l_e$, i.e., raise the core volume. There is, however, a problem in that, for the high output current $I_o$, the volume of the inductor 23 is excessively large. Therefore, according to the present embodiment, as the current control units 12-1, 12-2, . . . , 12-n including the inductors 23 are arranged in parallel, the high output current $I_o$ is achieved while an increase in the size of the individual inductor 23 is prevented.

The output current $I_o$ is the synthesis of the inductor currents i[1] to i[n] output from the respective current control units 12-1 to 12-n. That is, the output current $I_o$ is represented by the following Equation (3).

$$Io = i_{[1]} + i_{[2]} + \Lambda + i_{[n]} = \Sigma_{k=1}^{n} i_{[k]} \tag{3}$$

The capacitor 14 is connected to the LD 2 in parallel, and it has the function to control ripples of the output current $I_o$. Although ripple currents need to be controlled so as not to exceed the maximum allowable current magnitude of the LD 2, it is sometimes not necessary to control it in some use situations. Therefore, if control on ripple currents is not necessary, the capacitor 14 does not need to be provided.

FIG. 2 is a graph that illustrates the relation between the output current $I_o$ and electric-power conversion efficiency η in a voltage conversion circuit with a switching control method. FIG. 2 illustrates that the electric-power conversion efficiency η has the single maximum value (maximum electric-power conversion efficiency $η_{max}$) at a current value $In_{max}$.

FIG. 3 is a graph that illustrates the relation between the output current $I_o$ and the electric-power conversion efficiency η when four voltage conversion circuits with the same switching control method are arranged in parallel. FIG. 3 illustrates that the electric-power conversion efficiency η has four maximum values when the four voltage conversion circuits are driven. In this way, multiple voltage conversion circuits are arranged in parallel, and the number of voltage conversion circuits in operation is changed in accordance with the target current value of the output current $I_o$ so that the high electric-power conversion efficiency η can be retained in a wide range of the current value of the output current $I_o$.

Therefore, in the drive circuit 3 according to the present embodiment, the current control units 12-1 to 12-n are connected in parallel with a switching control method so that the current value of each of the current control units 12-1 to 12-n is decreased and the high output current $I_o$ is achieved without increasing the size of the inductor 23. Thus, the output current $I_o$ of a large current value (e.g., a few hundred A) can be output without causing magnetic saturation in the inductor 23. Furthermore, the drive states of the current control units 12-1 to 12-n are controlled in accordance with the target current value of the output current $I_o$ so that high outputs can be achieved while the high electric-power conversion efficiency η is retained.

FIG. 4 is a timing chart that illustrates the relation among the target current value Ictrl, the timing signals PWMH, PWML, the inductor current i, and the output current $I_o$ according to the first embodiment. The target current value Ictrl input from an external device to the calculation unit 13 is, for example, an analog signal whose current value is determined in accordance with a voltage or a digital signal that uses I2C (registered trademark), or the like. After the target current value Ictrl is input to the calculation unit 13, the duty ratios of the timing signals PWMH[1] to PWMH[n], PWML[1] to PWML[n] fed to the respective current control units 12-1 to 12-n are adjusted in accordance with the target current value Ictrl.

The lower section in FIG. 4 illustrates an enlarged view of the timing signals PWMH[n], PWML[n]. The duty ratio D[n] of the timing signal PWMH[n] is D[n]=Ton[n]/T, where the ON time of the timing signal PWMH[n] to the first switching element 21 is Ton[n] and a cycle is T. Furthermore, as the timing signal PWML[n] to the second switching element 22 is an inversion signal of the timing signal PWMH[n] to the first switching element 21, the duty ratio of the timing signal PWML[n] is 1−D[n].

FIG. 5 is a graph that illustrates the relation between the duty ratio D of the timing signal PWMH and the inductor current i according to the first embodiment. The inductor currents i, i.e., currents output from the current control units 12-1 to 12-n, are linearly changed in accordance with the duty ratio D of the timing signal PWMH to the first switching element 21. Furthermore, according to this example, when the inductor current i is 0, the duty ratio D≠0; however, this relation is an example, and changes are made in accordance with the characteristics of the LD 2.

FIG. 6 is a graph that illustrates the relation between the output current $I_o$ and a forward voltage $V_f$ of the LD 2 according to the first embodiment. The forward voltage $V_f$ is a voltage at both ends of the LD 2 in a forward direction with respect to the output current $I_o$. The forward voltage $V_f$ of the LD 2 changes in accordance with the output current $I_o$. After the output current $I_o$ exceeds a certain value, the forward voltage $V_f$ linearly changes with regard to the output current $I_o$. Typically, the drive current (the output current $I_o$) of the LD 2 is used in such a linear area. Therefore, the current differential value of the forward voltage $V_f$ in a linear area is $γ_d = ΔV_f/ΔI_o$, and the forward voltage $V_f$ is a threshold voltage $V_{f0}$ when the output current $I_o$=0, obtained from an approximation line in the linear area. The threshold voltage $V_{f0}$ occurs due to a potential barrier of the LD 2. Here, the forward voltage $V_f$ is represented by the following Equation (4) where an LD internal resistance, which is an internal resistance of the LD 2, is $r_d$.

$$V_f = r_d \cdot Io + V_{f0} \tag{4}$$

FIG. 7 is a diagram that illustrates a state where duty ratios D[1] to D[n], 1-D[1] to 1-D[n], inductance L[1] to L[n], control-unit internal resistances $r_L[1]$ to $r_L[n]$, a forward voltage $V_f$, an LD internal resistance $r_d$, and a threshold voltage $V_{f0}$ are described in the configuration diagram of the light emitting device 1 illustrated in FIG. 1.

The duty ratios D[1] to D[n] are calculated by the calculation unit 13, and each of them operates in the corresponding first switching element 21. The duty ratios 1-D[1] to 1-D[n] are calculated by the calculation unit 13, and each of them operates in the corresponding second switching element 22. The inductance L[1] to L[n] represents the inductance of the inductor 23 included in each of the current control units 12-1 to 12-n. The control-unit internal resistances $r_L[1]$ to $r_L[n]$ represent the respective internal resistances of the current control units 12-1 to 12-n. The control-unit internal resistances $r_L[1]$ to $r_L[n]$ correspond to parasitic resistances due to the inductance L[1] to L[n] in the current control units 12-1 to 12-n, wiring resistance, and the like. The forward voltage $V_f$ represents a voltage at both ends of the LD 2 in a forward direction with respect to the output current $I_o$. The LD internal resistance $r_d$ represents the internal resistance of the LD 2. The threshold voltage $V_{f0}$ represents a voltage due to a potential barrier of the LD 2.

The output current $I_o$ is calculable by the following Equation (5) according to a state averaging technique by using the input voltage $V_{in}$ of the direct-current power source 11, the number n of the current control units 12-1 to 12-n, the control-unit internal resistances $r_L[1]$ to $r_L[n]$, the duty ratios D[1] to D[n] corresponding to the first switching elements 21, the LD internal resistance $r_d$, and the threshold voltage $V_{f0}$.

$$Io = \frac{\sum_{k=1}^{n} \frac{D[k]}{r_L[k]} \cdot V_{in} - \sum_{k=1}^{n} \frac{1}{r_L[k]} \cdot V_{f0}}{1 + \sum_{k=1}^{n} \frac{1}{r_L[k]} \cdot r_d} \quad (5)$$

An appropriate memory previously stores the LD internal resistance $r_d$ and the threshold voltage $V_{f0}$, which are characteristics of the LD 2, and the control-unit internal resistances $r_L[1]$ to $r_L[n]$, which are characteristics of the current control units 12-1 to 12-n, so that the duty ratios D[1] to D[n], 1-D[1] to 1-D[n], or the like, for outputting the desired output current $I_o$ can be calculated from Equation (5). Thus, without using current sensors, or the like, the output current $I_o$ can be controlled.

FIG. 8 is a diagram that illustrates the relation among the target current value Ictrl with regard to the light emitting device 1 according to the first embodiment, the duty ratio D, the inductor current i, and the output current $I_o$. According to this example, the target current value Ictrl is changed during driving. D1 in FIG. 8 denotes the duty ratio that corresponds to the target current value Ictrl before it is changed, and D2 denotes the duty ratio that corresponds to the target current value Ictrl after it is changed. The duty ratios D1, D2 can be calculated by using Equation (5). The duty ratios D1, D2 are applied to control on the switching elements 21, 22 so that the current value of each of the inductor currents i is changed and the output current $I_o$ can be the target current value Ictrl.

Furthermore, if the control-unit internal resistances $r_L[1]$ to $r_L[n]$ are identical to the duty ratios D[1] to D[n] of the current control units 12-1 to 12-n, respectively, Equation (5) can be simplified to the following Equation (6).

$$Io = \frac{D \cdot V_{in} - V_{f0}}{\frac{r_L}{n} + r_d} \quad (6)$$

With reference to FIGS. 9 to 11, an explanation is given below of a case where the current control units 12-1 to 12-n are individually stopped.

FIG. 9 is a diagram that illustrates a state where the first switching element 21 in the n-th current control unit 12-n according to the first embodiment is off and the second switching element 22 is on. If current supply from the n-th current control unit 12-n to the LD 2 is stopped, the timing signal PWMH[n] to the first switching element 21 is set to L so that the first switching element 21 is turned off and the connection between the direct-current power source 11 and the LD 2 is blocked. At this time, if the second switching element 22 is on (if the timing signal PWML[n] is H in a certain cycle), the LD 2 and the ground 25 are connected through the inductor 23 and the second switching element 22. Therefore, in some cases, part of the output current $I_o$, which is a synthesis of the inductor currents i[1], i[2] output from the first and second current control units 12-1, 12-2 that are being driven, leak to the ground 25 through the inductor 23 and the second switching element 22 in the n-th current control unit 12-n, the inductor current i[n] of the n-th current control unit 12-n becomes negative, and current supply to the LD 2 becomes insufficient. Therefore, it is preferable that, to stop the n-th current control unit 12-n from being driven, not only the first switching element 21 but also the second switching element 22 is turned off.

FIG. 10 is a diagram that illustrates a state where the first switching element 21 and the second switching element 22 in the n-th current control unit 12-n according to the first embodiment are off. In this way, to individually stop the n-th current control unit 12-n from being driven, both the first switching element 21 and the second switching element 22 are turned off so that the connection between the LD 2 and the ground 25 is blocked and leak of the output current $I_o$ to the ground 25 can be prevented.

FIG. 11 is a timing chart that illustrates the relation among the target current value Ictrl, the duty ratio D, the timing signals PWMH, PWML, the inductor current i, and the output current $I_o$ in the state illustrated in FIG. 10. As illustrated in FIG. 11, to stop the n-th current control unit 12-n from being driven, the timing signal PWMH[n] to the first switching element 21 is set to L, and also the timing signal PWML[n] to the second switching element 22 is set to L. During typical operation, as the timing signal PWML[n] to the second switching element 22 is an inversion signal of the timing signal PWMH[n] to the first switching element 21, the timing signal PWML[n] is set to H when the timing signal PWMH[n] is set to L. Therefore, to individually stop the current control units 12-1 to 12-n, the calculation unit 13 sets both the timing signals PWMH, PWML, which are input to the target current control unit, to L so that the first switching element 21 and the second switching element 22 are simultaneously turned off. Thus, only a specific current control unit can be stopped without causing leak of the output current $I_o$.

FIG. 12 is a diagram that illustrates a configuration of the light emitting device 1 according to a modification of the first embodiment. Each of current control units 52-1 to 52-n in a drive circuit 51 according to this modification is configured by using a diode 53 instead of the above-described second switching element 22. The diode 53 is a semiconductor device that limits a current flowing direction to a certain direction to prevent the inductor current i from leaking into the ground 25. A calculation unit 55 according to this comparative example generates only the timing signal PWMH for controlling the first switching element 21 and does not generate the above-described timing signal PWML. With this configuration, only a specific current control unit among the current control units 52-1 to 52-$n$ can be stopped without causing leak of the output current $I_o$. Furthermore, with the drive circuit 51 according to this modification, as there is no need to generate the timing signal PWML to the second switching element 22, simplification of a circuit configuration, reduction in calculation loads, and the like, can be achieved.

FIG. 13 is a graph that illustrates the relation among the duty ratio D, the output current $I_o$, and the number of the current control units 12-1 to 12-$n$, 52-1 to 52-$n$ to be driven according to the first embodiment. The line segment corresponding to n=1 represents the relation between the duty ratio D and the output current $I_o$ when one of the current control units 12-1 to 12-$n$, 52-1 to 52-$n$ is driven. The line segment corresponding to n=2 represents the relation between the duty ratio D and the output current $I_o$ when two of the current control units 12-1 to 12-$n$, 52-1 to 52-$n$ are driven. The line segment corresponding to n=3 represents the relation between the duty ratio D and the output current $I_o$ when three of the current control units 12-1 to 12-$n$, 52-1 to 52-$n$ are driven. The line segment corresponding to n=4 represents the relation between the duty ratio D and the output current $I_o$ when four of the current control units 12-1 to 12-$n$, 52-1 to 52-$n$ are driven.

D2 indicates the duty ratio needed for the output current $I_o$ to reach the current value Itarget when n=2. D3 indicates the duty ratio needed for the output current $I_o$ to reach the current value Itarget when n=3. D4 indicates the duty ratio needed for the output current $I_o$ to reach the current value Itarget when n=4. $D_{max}$ indicates the maximum duty ratio with respect to each number to be driven. Absence of D1 in the graph indicates that when n=1, the output current $I_o$ does not reach the current value Itarget even if driving is conducted at the maximum duty ratio.

As the value of n is lager, the value of the output current $I_o$ corresponding to the maximum duty ratio $D_{max}$ is larger; therefore, it is understood that the larger output current $I_o$ can be output as the number of the current control units 12-1 to 12-$n$, 52-1 to 52-$n$ to be driven is larger. Furthermore, because of D4<D3<D2, it is understood that the duty ratio D needed to obtain the current value Itarget is smaller as the number of the current control units 12-1 to 12-$n$, 52-1 to 52-$n$ to be driven is larger.

With reference to FIGS. 14 to 16, an explanation is given below of operation to maintain the output current $I_o$ constant by changing the duty ratio while some of the current control units 12-1 to 12-$n$, 52-1 to 52-$n$ are dynamically stopped.

FIG. 14 is a timing chart that illustrates control if the number of the four current control units 12-1 to 12-4 to be driven is sequentially decreased according to the first embodiment. The example illustrated in FIG. 14 illustrates a case where the target current value Ictrl is Itarget and the number of the current control units 12-1 to 12-4 to be driven is decreased from 4 to 3 and then from 3 to 2. The duty ratio is D4 when the number to be driven is 4, the duty ratio is D3 when the number to be driven is 3, and the duty ratio is D2 when the number to be driven is 2. If the relation illustrated in FIG. 13 is applied, D4<D3<D2. That is, if the number to be driven is relatively large, the duty ratio used is relatively small, and if the number to be driven is relatively small, the duty ratio used is relatively large. Thus, when the number of the current control units 12-1 to 12-$n$ to be driven is dynamically changed, the current control units 12-1 to 12-$n$ in the middle of driving can be controlled at the duty ratio that corresponds to the number to be driven. By conducting this control, the output current $I_o$ can be kept at a constant value (Itarget).

FIG. 15 is a timing chart that illustrates control if the four current control units 12-1 to 12-4 according to the first embodiment are sequentially stopped one by one. In the example illustrated in FIG. 15, the four current control units 12-1 to 12-4 are sequentially stopped, starting from the fourth current control unit 12-4, the third current control unit 12-3, the second current control unit 12-2, and then the first current control unit 12-1. That is, according to this example, as the three current control units are driven on a constant basis, the driven current control units can be driven at the duty ratio D3. By conducting this control, the output current $I_o$ can be kept at a constant value (Itarget).

FIG. 16 is a timing chart that illustrates control if the target current value Ictrl is periodically changed according to the first embodiment. In the example illustrated in FIG. 16, the target current value Ictrl is periodically changed between 0 and Itarget, three of the four current control units 12-1 to 12-4 are driven at the duty ratio D3 when the first Itarget is output, and all of the four current control units 12-1 to 12-4 are driven at the duty ratio D4 when the second Itarget is output. In this way, even if the target current value Ictrl is periodically changed, control is performed such that the number of the current control units 12-1 to 12-4 to be driven corresponds to a duty ratio so that the output current $I_o$ can be kept at a desired value.

In the case described above, the number of the current control units 12-1 to 12-$n$ is 4; however, the same control may be performed if the number of the current control units 12-1 to 12-$n$ is other than 4. Furthermore, in the example described, the direct-current power source 11 is used as a power source; however, an alternating-current power source may be used. Moreover, in the example described, a laser diode (LD) is used as a light emitting element; however, the type of light emitting element is not particularly limited, and for example a light emitting diode (LED) may be used.

As described above, according to the present embodiment, multiple current control units are connected in parallel, including inductors and being driven by a switching control method, so that high output currents can be achieved without increasing the size of the inductor. Thus, the output current of a large current value (e.g., a few hundred A) can be output without causing magnetic saturation in the inductor. Furthermore, the drive states of the current control units are individually controlled in accordance with the target current value of the output current so that high outputs can be achieved while high electric-power conversion efficiency is retained.

An explanation is given below of other embodiments with reference to the drawings, and the parts for producing the function effect that is the same as or similar to that in the first embodiment are attached with the same reference numerals and their explanations are omitted.

Second Embodiment

FIG. 17 is a diagram that illustrates a configuration of the light emitting device 1 according to a second embodiment.

A drive circuit 71 according to the present embodiment has a failure detection function and a failure handling function. The failure detection function is a function to identify the faulty current control units 12-1 to 12-n in accordance with fluctuation in the output current $I_o$ when the current control units 12-1 to 12-n to be driven or stopped are sequentially changed. The failure handling function is a function to output the requested output current $I_o$ by controlling the normal current control units 12-1 to 12-n even when any of the current control units 12-1 to 12-n is faulty.

The drive circuit 71 according to the present embodiment includes a sensor 72 (current detection means) that detects the output current $I_o$. A calculation unit 75 according to the present embodiment identifies the faulty current control units 12-1 to 12-n in accordance with a detection current value Isens detected by the sensor 72, stops the faulty current control units 12-1 to 12-n, and controls the first switching element 21 and the second switching element 22 in the normal current control units (the current control units other than the faulty current control unit) 12-1 to 12-n so that the output current $I_o$ becomes the target current value Ictrl.

FIG. 18 is a timing chart that illustrates operation when the drive circuit 71 according to the second embodiment performs a failure detection function. In the example illustrated in FIG. 18, the four current control units 12-1 to 12-4 are sequentially stopped one by one. According to this example, a schedule is determined such that the fourth current control unit 12-4, the third current control unit 12-3, the second current control unit 12-2, and the first current control unit 12-1 are stopped in this order. According to this example, after the fourth current control unit 12-4 is stopped, the third current control unit 12-3 is stopped, and when the fourth current control unit 12-4 starts to be driven, the inductor current i[4] of the fourth current control unit 12-4 is lower than an ideal value 101. Therefore, the value of the output current $I_o$ when the fourth current control unit 12-4 starts to be driven is lower than an ideal value 102. Such a fluctuation of the output current $I_o$ is detected by the sensor 72 and is recognized by the calculation unit 75. That is, the calculation unit 75 can detect an error between the detection current value Isens detected by the sensor 72 and the ideal value 102 and determine that a failure occurs in the current control units 12-1 to 12-4 that start (restart) to be driven in timing in which the error is detected. According to this example, it is determined that the fourth current control unit 12-4 has a failure. Furthermore, in the example described, a circumstance where the output current $I_o$ is lower than the ideal value 102 is a failure; however, the fluctuation in the output current $I_o$ indicating a failure is not limited thereto, and for example there may be a circumstance where the output current $I_o$ is higher than the ideal value 102.

FIG. 19 is a timing chart that illustrates operation when the drive circuit 71 according to the second embodiment performs the failure handling function. In the example illustrated in FIG. 19, if a failure of the fourth current control unit 12-4 is detected as described above, duty-ratio control is conducted on only the normal current control units 12-1 to 12-3 as targets. According to the original schedule, when the third current control unit 12-3 is stopped, the first, second, and fourth current control units 12-1, 12-2, and 12-4 are driven at the duty ratio D3; however, with the failure handling function according to this example, the fourth current control unit 12-4 is stopped, and the first and second current control units 12-1, 12-2 are driven at the duty ratio D2. By this control, the requested output current $I_o$ can be output without being affected by the faulty fourth current control unit 12-4.

According to the above-described embodiment, without providing a failure detection means in each of the current control units 12-1 to 12-n, the faulty current control units 12-1 to 12-n can be identified and properly handled. Furthermore, as failures can be handled by conducting only duty-ratio control on the normal current control units 12-1 to 12-n, the output current $I_o$ can be promptly corrected after a failure occurs.

Third Embodiment

FIG. 20 is a diagram that illustrates a configuration of the light emitting device 1 according to a third embodiment. A drive circuit 81 according to the present embodiment includes block mechanisms 82A, 82B before and after each of the current control units 12-1 to 12-n. The block mechanisms 82A, 82B are circuits that block electric connection between the direct-current power source 11 and the LD 2 and that may be configured by using, for example, a relay or MOSFET. The block mechanisms 82A, 82B are used to block the faulty current control units 12-1 to 12-n from an electric pathway.

A calculation unit 85 according to the present embodiment has a faulty-part block function in addition to the failure detection function and the failure handling function described in the second embodiment. The faulty-part block function is a function to control the block mechanisms 82A, 82B so as to block the current control units 12-1 to 12-n in which a failure has been detected from an electric pathway. The calculation unit 85 according to this example outputs a block signal BR to the block mechanisms 82A, 82B connected before and after the current control units 12-1 to 12-n in which a failure has been detected by the failure detection function. After receiving the block signal BR, the block mechanisms 82A, 82B perform operation to block an electric connection. After blocking the faulty current control units 12-1 to 12-n, the calculation unit 85 conducts duty-ratio control on the remaining current control units (normal current control units) 12-1 to 12-n. Thus, the drive circuit 81 (the light emitting device 1) can be continuously driven.

As described above, the faulty current control units 12-1 to 12-n are blocked from an electric pathway so that the faulty current control units 12-1 to 12-n can be safely removed and replaced. Furthermore, as driving is continuously enabled by using the normal current control units 12-1 to 12-n after blocking, the faulty current control units 12-1 to 12-n can be handled without stopping the light emitting device 1 from being driven.

The embodiments of the present invention have been described above; however, the above embodiments are presented as examples, and there is no intension to limit the scope of the invention. The novel embodiments may be implemented as other various embodiments, and various omission, replacement, modification, and combination are possible without departing from the spirit of the invention. The embodiments and their modifications are included in the scope and spirit of the invention, and they are included in the scope of the invention described in claims and their equivalents.

REFERENCE SIGNS LIST

1 Light emitting device
2 LD (light emitting element)
3, 51, 71, 81 Drive circuit
11 Direct-current power source (power source)
12-1 to 12-n, 52-1 to 52-n Current control unit
13, 55, 75, 85 Calculation unit
14 Capacitor
21 First switching element 22 Second switching element
23 Inductor
24 Contact point
25 Ground
53 Diode
72 Sensor (current detection unit)
82A, 82B Block mechanism
101, 102 Ideal value
BR Block signal
D Duty ratio (corresponding to first switching element)
i Inductor current
Ictrl Target current value
$I_o$ Output current
Isens Detection current value
L Inductance
PWMH, PWML Timing signal (pulse modulation signal)
$r_d$ LD internal resistance
$r_L$ Control-unit internal resistance
$V_f$ Forward voltage
$V_{in}$ Input voltage

CITATION LIST

Patent Literature

PTL 1: Japanese Patent No. 6009132

The invention claimed is:

1. A drive circuit configured to generate an output current for driving a light emitting element, comprising:
a power source;
two or more current control units configured to control an amount of current supplied to the light emitting element in accordance with a pulse modulation signal; and
a calculation unit configured to change a duty ratio of the pulse modulation signal, wherein
each of the two or more current control units includes,
a first switching element configured to be switched on or off in accordance with the pulse modulation signal,
a second switching element configured to be switched on or off in accordance with an inversion signal of the pulse modulation signal input to the first switching element, and
an inductor,
the first switching element and the inductor are serially connected between the power source and the light emitting element,
the second switching element is connected between ground and a contact point of the first switching element and the inductor
the two or more current control units are connected in parallel, and
the calculation unit is configured to individually stop at least a first current control unit among the two or more current control units.

2. The drive circuit according to claim 1, wherein the calculation unit is configured to adjusts the duty ratio in accordance with the output current, a voltage of the power source, a number of the two or more current control units, an internal resistance of the two or more current control units, an internal resistance of the light emitting element, and a threshold voltage due to a potential barrier of the light emitting element.

3. The drive circuit according to claim 1, wherein the calculation unit is configured to calculates the duty ratio in accordance with Equation (1) described below, where the output current is Io, a voltage of the power source is Vin, a number of the two or more current control units is n, an internal resistance of a respective current control unit among the two or more current control units is rL[k], the duty ratio that corresponds to the first switching element is D[k], an internal resistance of the light emitting element is rd, and a threshold voltage due to a potential barrier of the light emitting element is VfO $$Io = \frac{\sum_{k=1}^{n} \frac{D[k]}{r_L[k]} \cdot V_{in} - \sum_{k=1}^{n} \frac{1}{r_L[k]} \cdot V_{f0}}{1 + \sum_{k=1}^{n} \frac{1}{r_L[k]} \cdot r_d} \qquad (1)$$

4. The drive circuit according to claim 1, wherein the output current satisfies Equation (2) described below, where the output current is Io, a voltage of the power source is Vin, a number of the two or more current control units is n, an internal resistance of a respective current control unit among the two or more current control units is rL[k], the duty ratio that corresponds to the first switching element is D[k], an internal resistance of the light emitting element is rd, and a threshold voltage due to a potential barrier of the light emitting element is VfO $$Io = \frac{\sum_{k=1}^{n} \frac{D[k]}{r_L[k]} \cdot V_{in} - \sum_{k=1}^{n} \frac{1}{r_L[k]} \cdot V_{f0}}{1 + \sum_{k=1}^{n} \frac{1}{r_L[k]} \cdot r_d} \qquad (2)$$

5. The drive circuit according to claim 1, wherein the calculation unit is configured to individually stop the first current control unit by switching off the first switching element and the second switching element in the first current control unit.

6. The drive circuit according to claim 1, further comprising:
a current detection unit configured to detect the output current, wherein
the calculation unit is configured to identify the first current control unit as faulty in accordance with a fluctuation in the output current detected when the first current control unit is switched.

7. The drive circuit according to claim 6, wherein the calculation unit is configured to:
stops the first current control unit in response to identifying the first current control unit as faulty; and
controls the duty ratio for a second current control unit among the two or more current control units.

8. The drive circuit according to claim 6, further comprising:
a block unit configured to block the first current control unit from an electric pathway.

9. A light emitting device comprising a light emitting element configured to be driven with an output current generated by the drive circuit according to claim 1.

10. The drive circuit according to claim 1, wherein the calculation unit is configured to individually stop the first current control unit in response to a change in a number of current control units to be driven.

11. A drive circuit configured to generate an output current for driving a light emitting element, comprising:

a power source;

two or more current control units configured to control an amount of current supplied to the light emitting element in accordance with a pulse modulation signal; and a calculation unit configured to change a duty ratio of the pulse modulation signal, wherein each of the two or more current control units includes
a switching element configured to be switched on or off in accordance with the pulse modulation signal,
an inductor, and
a diode configured to limit flow of a current from the inductor to ground, wherein the switching element and the inductor are serially connected between the power source and the light emitting element, the diode is connected between the ground and a contact point of the switching element and the inductor, the two or more current control units are connected in parallel, and the calculation unit is configured to individually stop at least a first current control unit among the two or more current control units.

12. The drive circuit according to claim 11, wherein the calculation unit is configured to individually stop the first current control unit in response to a change in a number of current control units to be driven.

13. The drive circuit according to claim 11, wherein the calculation unit is configured to individually stop the first current control unit by switching off the switching element.

14. The drive circuit according to claim 11, wherein the calculation unit is configured to adjust the duty ratio in accordance with the output current, a voltage of the power source, a number of the two or more current control units, an internal resistance of the two or more current control units, an internal resistance of the light emitting element, and a threshold voltage due to a potential barrier of the light emitting element.

15. The drive circuit according to claim 11, wherein the calculation unit is configured to calculate the duty ratio in accordance with Equation (1) described below, where the output current is Io, a voltage of the power source is Vin, a number of the two or more current control units is n, an internal resistance of a respective current control unit among the two or more current control units is $r_L[k]$, the duty ratio that corresponds to the switching element is $D[k]$, an internal resistance of the light emitting element is rd, and a threshold voltage due to a potential barrier of the light emitting element is VfO.

$$Io = \frac{\sum_{k=1}^{n} \frac{D[k]}{r_L[k]} \cdot V_{in} - \sum_{k=1}^{n} \frac{1}{r_L[k]} \cdot V_{f0}}{1 + \sum_{k=1}^{n} \frac{1}{r_L[k]} \cdot r_d} \quad (1)$$

16. The drive circuit according to claim 11, wherein the output current satisfies Equation (2) described below, where the output current is Io, a voltage of the power source is Vin, a number of the two or more current control units is n, an internal resistance of a respective current control unit among the two or more current control units is $r_L[k]$, the duty ratio that corresponds to the switching element is $D[k]$, an internal resistance of the light emitting element is rd, and a threshold voltage due to a potential barrier of the light emitting element is VfO.

$$Io = \frac{\sum_{k=1}^{n} \frac{D[k]}{r_L[k]} \cdot V_{in} - \sum_{k=1}^{n} \frac{1}{r_L[k]} \cdot V_{f0}}{1 + \sum_{k=1}^{n} \frac{1}{r_L[k]} \cdot r_d} \quad (2)$$

17. The drive circuit according to claim 11, further comprising:
a current detection unit configured to detect the output current, wherein
the calculation unit is configured to identify a first current control unit among the two or more current control units as faulty in accordance with a fluctuation in the output current detected when the first current control unit is switched.

18. The drive circuit according to claim 17, wherein the calculation unit is configured to:
stop the first current control unit in response to identifying the first current control unit as faulty; and
control the duty ratio for a second current control unit among the two or more current control units.

19. The drive circuit according to claim 17, further comprising:
a block unit configured to block the first current control unit from an electric pathway.

20. A drive circuit configured to generate an output current for driving a light emitting element, comprising:
a power source;
two or more current control units configured to control an amount of current supplied to the light emitting element in accordance with a pulse modulation signal; and
a calculation unit configured to change a duty ratio of the pulse modulation signal, wherein
each of the two or more current control units includes,
a first switching element configured to be switched on or off in accordance with the pulse modulation signal,
a second switching element configured to be switched on or off in accordance with an inversion signal of the pulse modulation signal input to the first switching element, and
an inductor,
the first switching element and the inductor are serially connected between the power source and the light emitting element,
the second switching element is connected between ground and a contact point of the first switching element and the inductor,
the two or more current control units are connected in parallel, and
the calculation unit is configured to adjust the duty ratio in accordance with the output current, a voltage of the power source, a number of the two or more current control units, an internal resistance of the two or more current control units, an internal resistance of the light emitting element, and a threshold voltage due to a potential barrier of the light emitting element.

* * * * *